United States Patent
Khan et al.

(10) Patent No.: US 7,756,066 B2
(45) Date of Patent: Jul. 13, 2010

(54) SEAMLESS SPANNING TREE RESTART OF A SINGLE SUPERVISOR

(75) Inventors: Tameen Khan, Santa Clara, CA (US);
Amitkumar Patel, Fremont, CA (US);
Ronak Desai, Fremont, CA (US);
Ramana Mellacheruvu, San Jose, CA (US); Umesh Mahajan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 675 days.

(21) Appl. No.: 11/329,681

(22) Filed: Jan. 10, 2006

(65) Prior Publication Data
US 2007/0159987 A1    Jul. 12, 2007

(51) Int. Cl.
*H04L 12/28* (2006.01)
(52) U.S. Cl. ................. 370/256; 370/250; 455/427
(58) Field of Classification Search .......... 370/256, 370/250, 254, 219; 455/427
See application file for complete search history.

(56) References Cited

U.S. PATENT DOCUMENTS

| | | | |
|---|---|---|---|
| 6,801,506 B1 | 10/2004 | Dey | |
| 6,898,189 B1 | 5/2005 | DiBenedetto et al. | |
| 7,411,915 B1* | 8/2008 | Spain et al. | 370/250 |
| 2001/0012775 A1* | 8/2001 | Modzelesky et al. | 455/427 |
| 2003/0179707 A1* | 9/2003 | Bare | 370/235 |
| 2004/0179524 A1 | 9/2004 | Sasagawa et al. | |
| 2005/0007951 A1* | 1/2005 | Lapuh et al. | 370/225 |
| 2005/0157741 A1 | 7/2005 | Wu et al. | |
| 2005/0264420 A1 | 12/2005 | Vogel, Jr. et al. | |
| 2006/0092862 A1* | 5/2006 | Benedetto et al. | 370/256 |
| 2006/0126534 A1* | 6/2006 | Huibregtse | 370/254 |
| 2006/0146697 A1* | 7/2006 | Magret et al. | 370/219 |

OTHER PUBLICATIONS

Cisco Systems, Inc., "*Cisco Nonstop Forwarding and Timer Manipulation for Fast Convergence*," 2004, pp. 1-14.

Cisco Systems Inc., "*Cisco Nonstop Forwarding with Stateful Switchover*," Dec. 12, 2004, Internet Archive Wayback Machine, http://www.cisco.com/en/US/tech/tk869/tk769/technologies_white_paper0900aecd801dc5e2.shtml, pp. 1-30.

(Continued)

*Primary Examiner*—Dang T Ton
*Assistant Examiner*—Wei Zhao
(74) *Attorney, Agent, or Firm*—Weaver Austin Villeneuve & Sampson LLP

(57) ABSTRACT

Disclosed are methods and apparatus for restarting a first network device having a plurality of ports for receiving and transmitting layer 2 data. The first network device belongs to a network of network devices. When a restart of at least a portion of the first network device is imminent whereby STP is no longer functioning for the first network device during the restart and can no longer alter a spanning tree protocol (STP) state of one or more of the ports and such ports that remain in a fixed state during the restart are referred to as restarting ports, a current state (such as forwarding) of each restarting port is maintained during the restart under predefined conditions. During the restart, each of the restarting ports of the restarting network device portion cooperate with its peer port of a second non-restarting network device that is a neighbor of the first network device so as to prevent layer 2 loops in the network.

18 Claims, 21 Drawing Sheets

OTHER PUBLICATIONS

Cisco Systems, Inc., "*Cisco NSF and Timer Manipulation for Fast Convergence,*" Dec. 5, 2004, Internet Archive Wayback Machine, Http://www.cisco.com/en/US/tech/tk869/tk769/technologies_white_paper09186a00801dce40.shtml, pp. 1-8.

Search Report and Written Opinion dated Jan. 1, 2007 in PCT Application 2007/000565.

U.S. Office Action dated Oct. 1, 2008 issued in U.S. Appl. No. 10/329,863.

U.S. Final Office Action dated Apr. 2, 2009 issued in U.S. Appl. No. 10/329,863.

U.S. Office Action dated Aug. 7, 2009 issued in U.S. Appl. No. 10/329,863.

U.S. Office Action dated Jan. 15, 2010 issued in U.S. Appl. No. 10/329,863.

Search Report dated Mar. 15, 2010 for European Application No. 07709687.3.

* cited by examiner

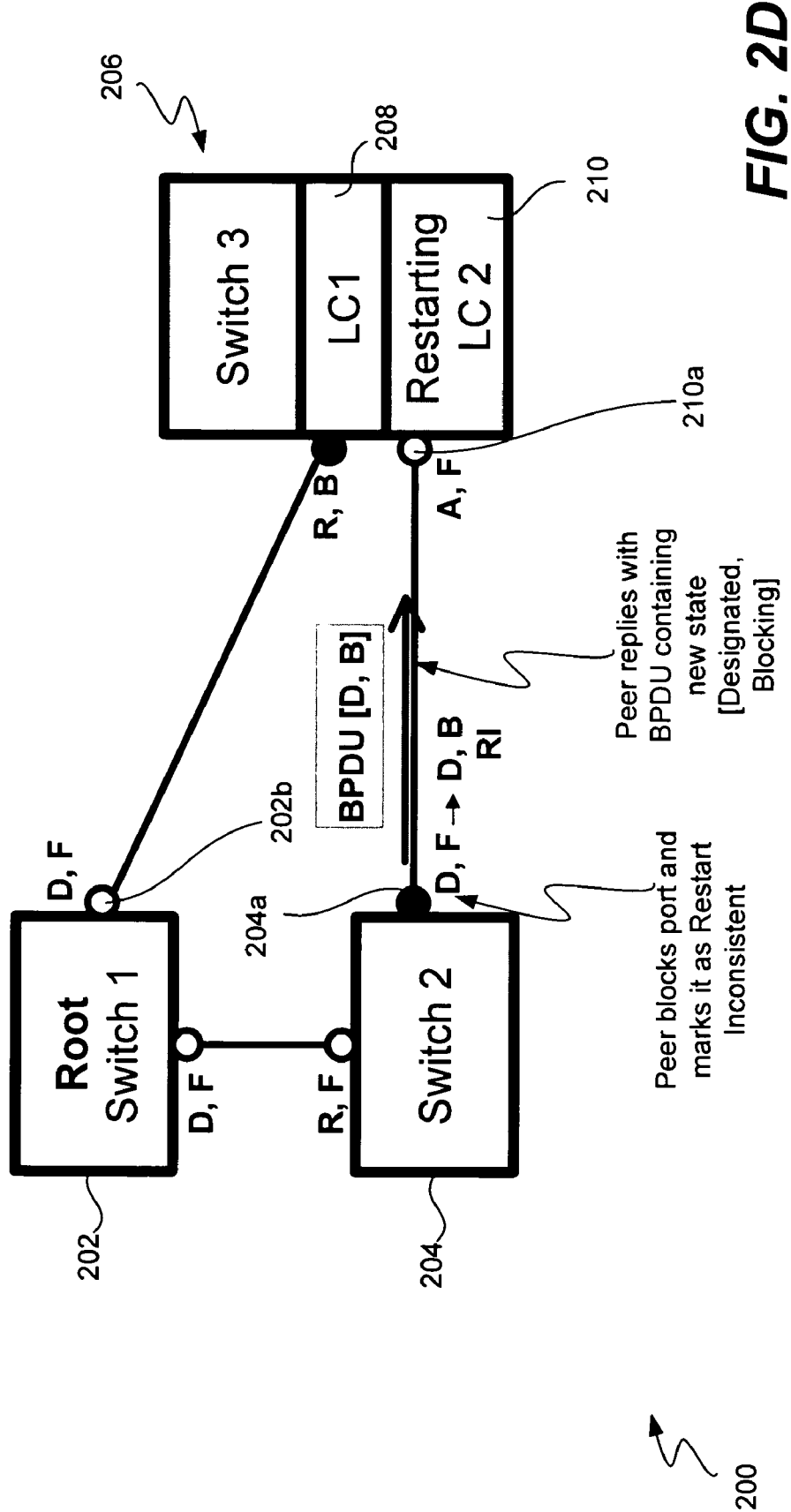

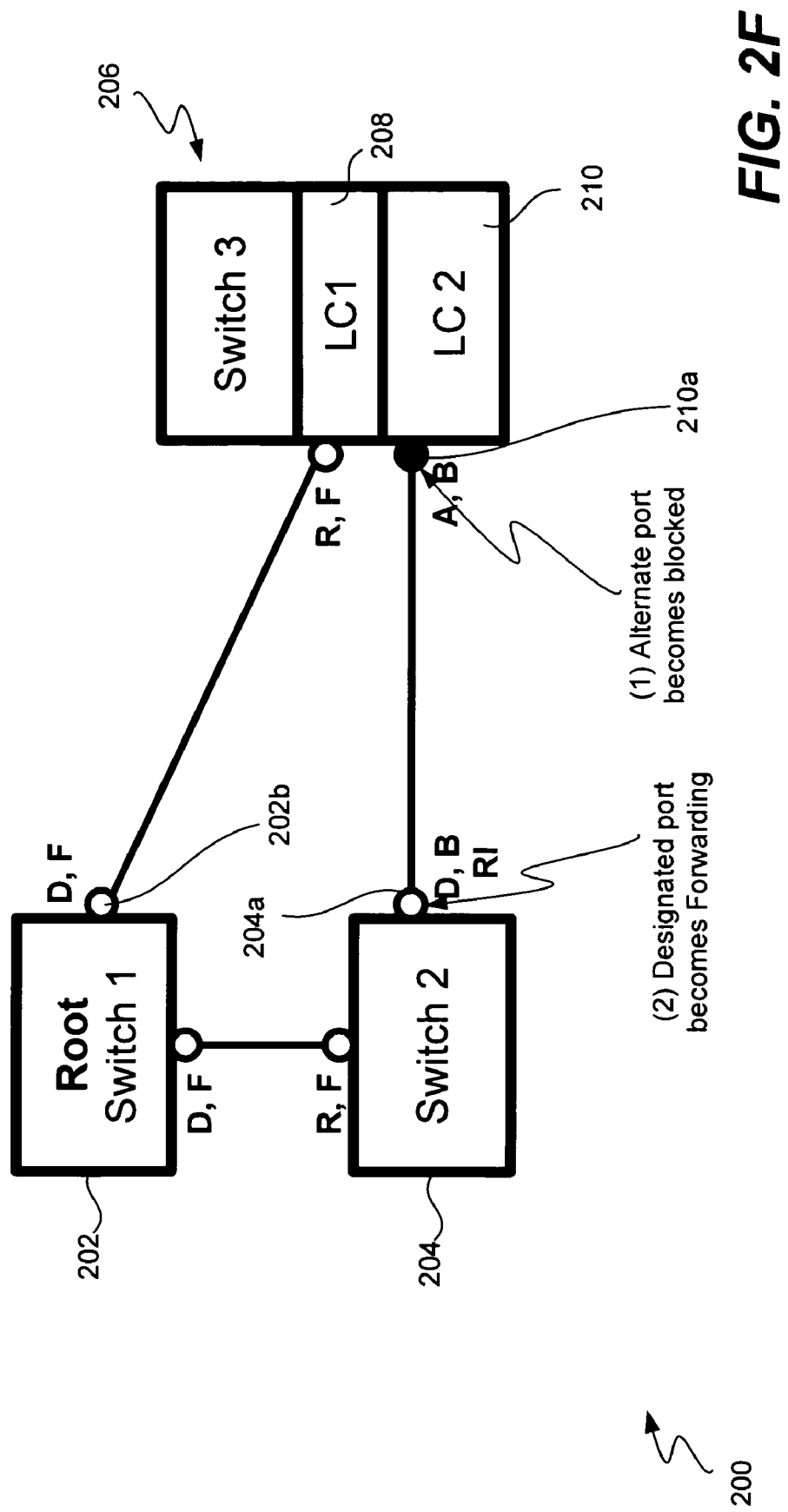

SEAMLESS SPANNING TREE RESTART OF A SINGLE SUPERVISOR

CROSS REFERENCE TO RELATED PATENT APPLICATION

This application is related to concurrently filed U.S. patent application Ser. No. 11/329,863, entitled SEAMLESS SPANNING TREE UPGRADE OF A LINECARD by Tameen Khan, et al., which application is incorporated herein by reference in its entirety for all purposes.

BACKGROUND OF THE INVENTION

1. Field of the Invention

The field of the invention relates generally to mechanisms for maintaining a loop-free topology in a layer 2 switched network or the like. More particularly, it is related to mechanisms for maintaining a loop-free topology during restart of a network device's (e.g., switch's) software.

2. Background of the Invention

The Spanning Tree Protocol (STP) typically executes on a switch and is responsible for maintaining a loop free topology in a Layer 2 (L2) switched network. A general description of the STP algorithm may be found in the IEEE standard documents (1) "IEEE standard for local and metropolitan area networks—common specification. Part 3: media access control (MAC) bridges—amendment 2: rapid reconfiguration", LAN/MAN Standards Committee of the IEEE Computer Society, USA, IEEE Std 802.1w-2001, E-ISBN: 0-7381-2925-9, ISBN: 0-7381-2924-0, (2001) and (2) "IEEE Standard for Local and metropolitan area networks Media Access Control (MAC) Bridges", IEEE Std 802.1D-2004 (Revision of IEEE Std 802.1D-1998), E-ISBN: 0-7381-3982-3, ISBN: 0-7381-3982-3, (2004), which documents are incorporated herein by reference in their entirety. STP operates by periodically exchanging Bridge Protocol Data Units (BPDUs) with neighbor switches and setting port states to Forwarding/Blocking/Listening/Learning appropriately.

Today, when a switch linecard's software is to be restarted, for example, during an upgrade or downgrade procedure, all L2 ports on the linecard are brought down for the period of the restart. This causes disruption of L2 traffic and reconvergence of network topology. The ports have to be brought down during restart because port state on the restarting linecard cannot be changed since the software that alters the port states, referred to as the "Linecard control plane software", is unavailable once the restart has commenced. If the L2 ports are not brought down during restart, topology change in the rest of the network could result in a loop during the restart. Additionally, the blocked ports of the restarting linecard will cause a topology change that affects the entire network. In other words, the STP topology will have to converge again so as to determine alternative paths around the blocked ports.

Another situation is when the control plane software is restarted (e.g., during an upgrade or downgrade) in a switch with a single supervisor or the supervisor software itself is being upgraded. The supervisor typically is responsible for exchanging control messages with other switches to thereby implement STP, among other tasks. During restart of a supervisor of a switch, BPDUs cannot be exchanged between the restarting switch and other switches. When a non-restarting switch in the network fails to receive a BPDU for the two times Forwarding Delay (30 sec), this may cause an alteration in the port states of the non-restarting switch, which can cause loops. Because of this, in current implementations, all L2 ports are brought down during single supervisor restart, so that they cannot contribute to loop formation.

In sum, current mechanisms for handling software restart of supervisor or linecard software is disruptive for L2 data plane traffic as all ports are brought down to thereby result in Spanning Tree topology reconvergence. Accordingly, improved, non-disruptive mechanisms for maintaining a loop-free layer 2 topology during a software upgrade of a network device's linecard or supervisor software are needed.

SUMMARY OF THE INVENTION

The present invention provides methods and apparatus for providing a restart of a network device, such as a switch, that is minimally disruptive and prevents the formation of loops in the network. In general, the type of restart contemplated herein occurs when the network device's software for altering the device's port states or for implementing the spanning tree protocol (STP), as well as other functions, is unavailable. In one case, the switch has a supervisor that executes control protocol software for the other linecards and their ports in the switch, and this supervisor is undergoing a software upgrade. Embodiments of the present invention allow a restarting switch's ports to continue forwarding under certain conditions. The restarting switch also coordinates with its neighbors so that the neighbors can assist in preventing loops.

In one embodiment, a method of restarting a first network device having a plurality of ports for receiving and transmitting layer 2 data is disclosed. The first network device belongs to a network of network devices. When a restart of at least a portion of the first network device is imminent whereby STP is no longer functioning for the first network device during the restart and can no longer alter a spanning tree protocol (STP) state of one or more of the ports and such ports that remain in a fixed state during the restart are referred to as restarting ports, a forwarding state of each restarting port that is in a forwarding state is maintained during the restart under predefined conditions. During the restart, each of the restarting ports of the restarting network device portion cooperate with its peer port of a second non-restarting network device that is a neighbor of the first network device so as to prevent layer 2 loops in the network.

In one embodiment, the restarting network portion is a single supervisor in the first network device and STP control software on the supervisor is no longer functioning for the first network device during the restart, and a complete STP state is stored for the first network device in persistent storage that can be retrieved after the restart by the first network device. In a further aspect, each restarting port that is a Portfast port is maintained in a forwarding state during the restart and each restarting port that is shared by two or more other network devices is blocked during the restart. In a further implementation, each restarting port that is not shared or a Portfast port is maintained in a forwarding state if it is in a forwarding state during the restart if it is determined that its peer can cooperate to prevent loops, and peers that can cooperate to prevent loops during the restart are informed of the restart.

In one embodiment, informing the each peers can cause the each peer to perform the following operations: (i) as long as there is no topology change detected by the each peer, prohibiting aging out of information received from the first network device into the each peer and prohibiting sending of BPDU's to the first network device; and (ii) when there is a topology change detected by the each peer, aging out the information on each port of the peer that has an alternate or root role and is peering with the first network device and changing the state of each port that is peering with the first network device to blocking and marking as Restart-Inconsistent. In a further aspect, after each peer is informed that restart has completed, the each peer resumes STP operation for its peering ports.

In a further embodiment, the following operations are performed after restart: (a) if it is determined that no topology change has been detected by a peer of the first network device, recovering the stored STP state and performing a stateful restart of STP for the first network device; and (b) if it is determined that a topology change has been detected by a peer of the first network device, (i) initializing all ports of the first network device to a designated role and a blocking state and then starting STP if the first network device is a root switch, or (ii) if the first network device is not the root switch, obtaining STP port information from the first network device's old root port and populating the obtained STP port information out the other ports of the first network device and initializing all ports of the first network device to a designated role and a blocking state, except the old root port.

In another embodiment, the invention pertains to a network device operable to restart the network device having a plurality of ports for receiving and transmitting layer 2 data. The network device includes one or more processors and one or more memory. At least one of the memory and processors are adapted to provide at least some of the above described method operations.

In another embodiment, the invention pertains to a network system restarting a first network device having a plurality of ports for receiving and transmitting layer 2 data, wherein the first network device belongs to a network of network devices. The system includes a plurality of switches including a first switch and at least one neighbor switch coupled to the first network switch and the first switch being operable to (i) when a restart of at least a portion of the first switch is imminent whereby STP is no longer functioning for the first network device during the restart and can no longer alter a spanning tree protocol (STP) state of one or more of the ports and such ports that remain in a fixed state during the restart are referred to as restarting ports, maintaining a forwarding state of each restarting port that is in a forwarding state during the restart under predefined conditions, and (ii) during the restart, at least one of the restarting ports of the restarting switch portion cooperating with a peer port of the neighbor switch so as to prevent layer 2 loops in the network.

These and other features and advantages of the present invention will be presented in more detail in the following specification of the invention and the accompanying figures which illustrate by way of example the principles of the invention.

BRIEF DESCRIPTION OF THE DRAWINGS

FIGS. 2A through 2F illustrate Seamless Restart mechanisms for handling a role change of a restarting port, which would have resulted in a state change of blocking if the port's linecard was not restarting, in accordance with one implementation of the present invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

A planned restart occurs with respect to a particular network device when the network device's software for altering the device's port states or implementing the spanning tree protocol (STP) is unavailable. In one implementation, a switch is undergoing a software upgrade on one of its linecards so that the STP software cannot alter the upgrading linecard's port states or the upgrading linecard cannot flush its layer 2 MAC tables. In another implementation, the switch has a single supervisor that executes control operations for all the linecards and their ports in the switch, and this single supervisor is undergoing a software upgrade.

When a planned restart of the software (e.g., a linecard's software or a single supervisor's software) in a network device is imminent, mechanisms of the present invention allow layer 2 ports to keep forwarding, rather than being blocked, under certain conditions. If there is no topology change in the network during the restart, the restarting network device software does not itself cause a topology change. Additionally, when a topology change does occur in the network during the restart, this change does not result in a layer 2 loop. Topology changes on the restarting software's associated ports are deferred until after the restart completes to thereby maximize connectivity.

Any suitable mechanism may be implemented to facilitate a seamless restart in which ports associated with the restarting software can continue forwarding under certain conditions and topology changes do not result in loops. Embodiments of the present invention can be described at a high level as including ways to allow the restarting linecard's ports' neighbors to assist in preventing loops. That is, the restarting network device cooperates with its neighbor network devices so that the neighbors are aware of the restart and take preventive actions to prevent loops that may have otherwise occurred with respect to one or more ports of the restarting network device.

Figure 1A:
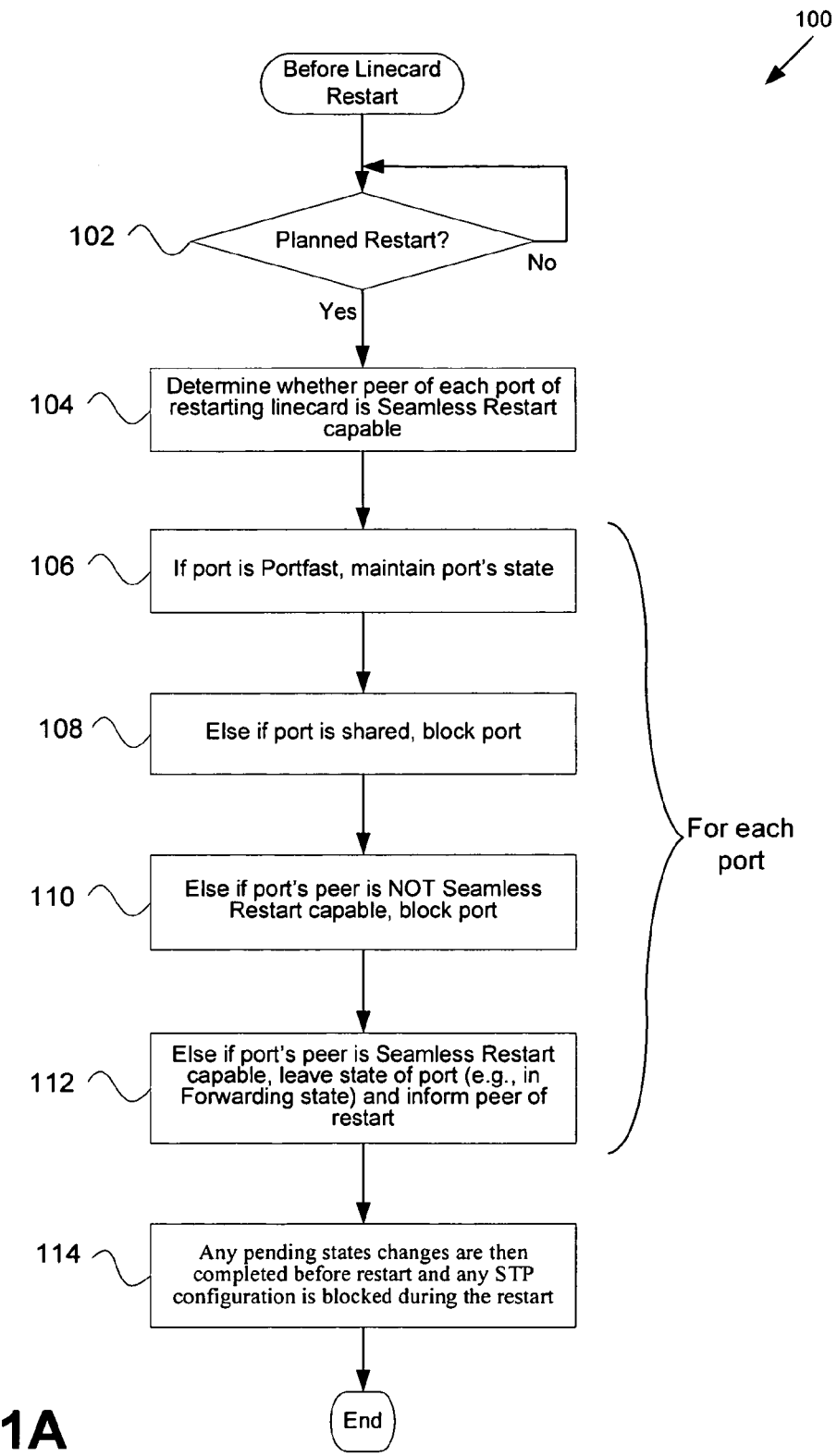
FIG. 1A is a flowchart illustrating a Seamless Restart procedure that occurs before a linecard planned restart in accordance with one embodiment of the present invention.
Figure 1B:
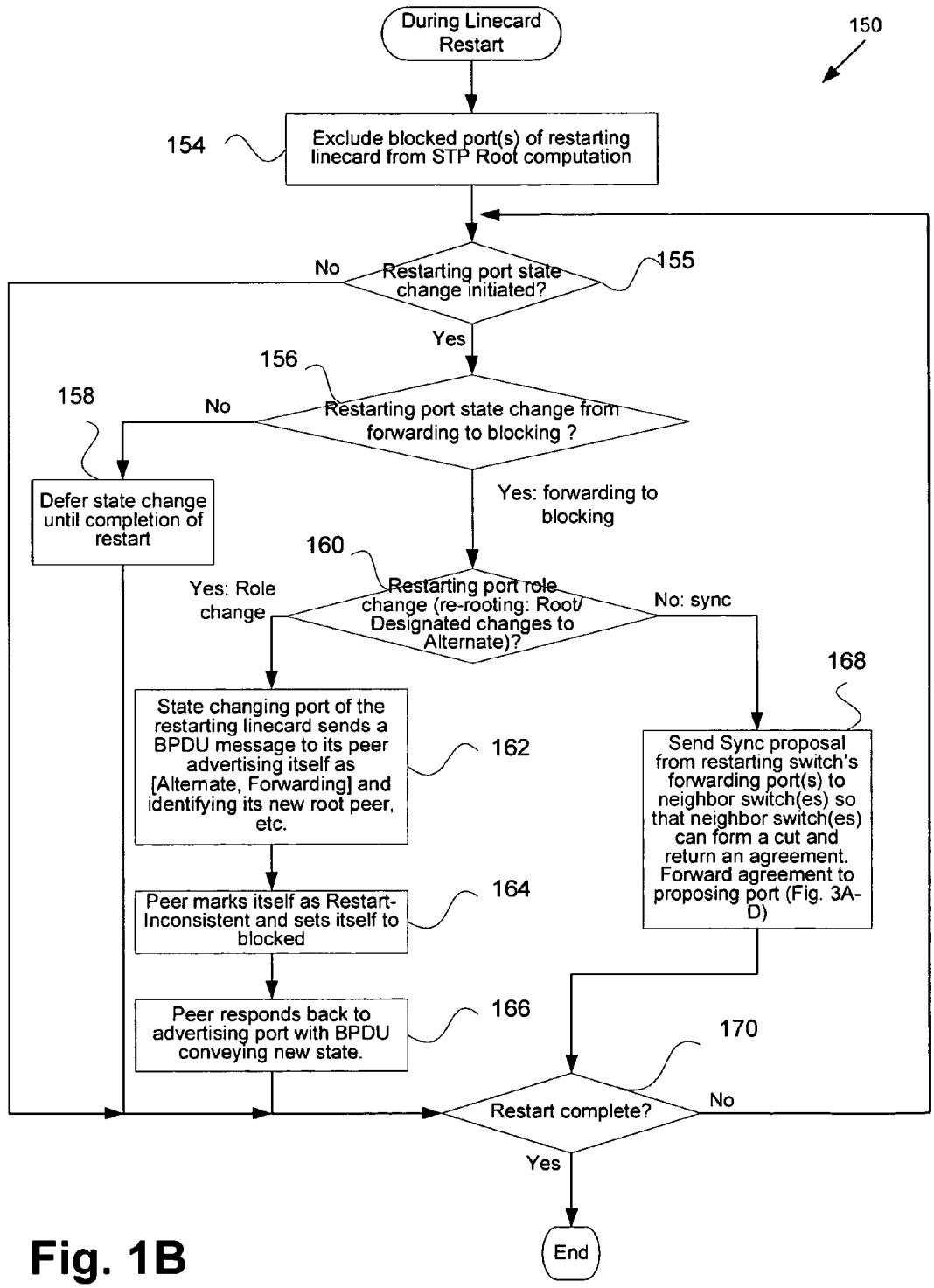
FIG. 1B is a flowchart illustrating a Seamless Restart procedure that is performed during a linecard restart in accordance with one implementation of the present invention.
Figure 1C:
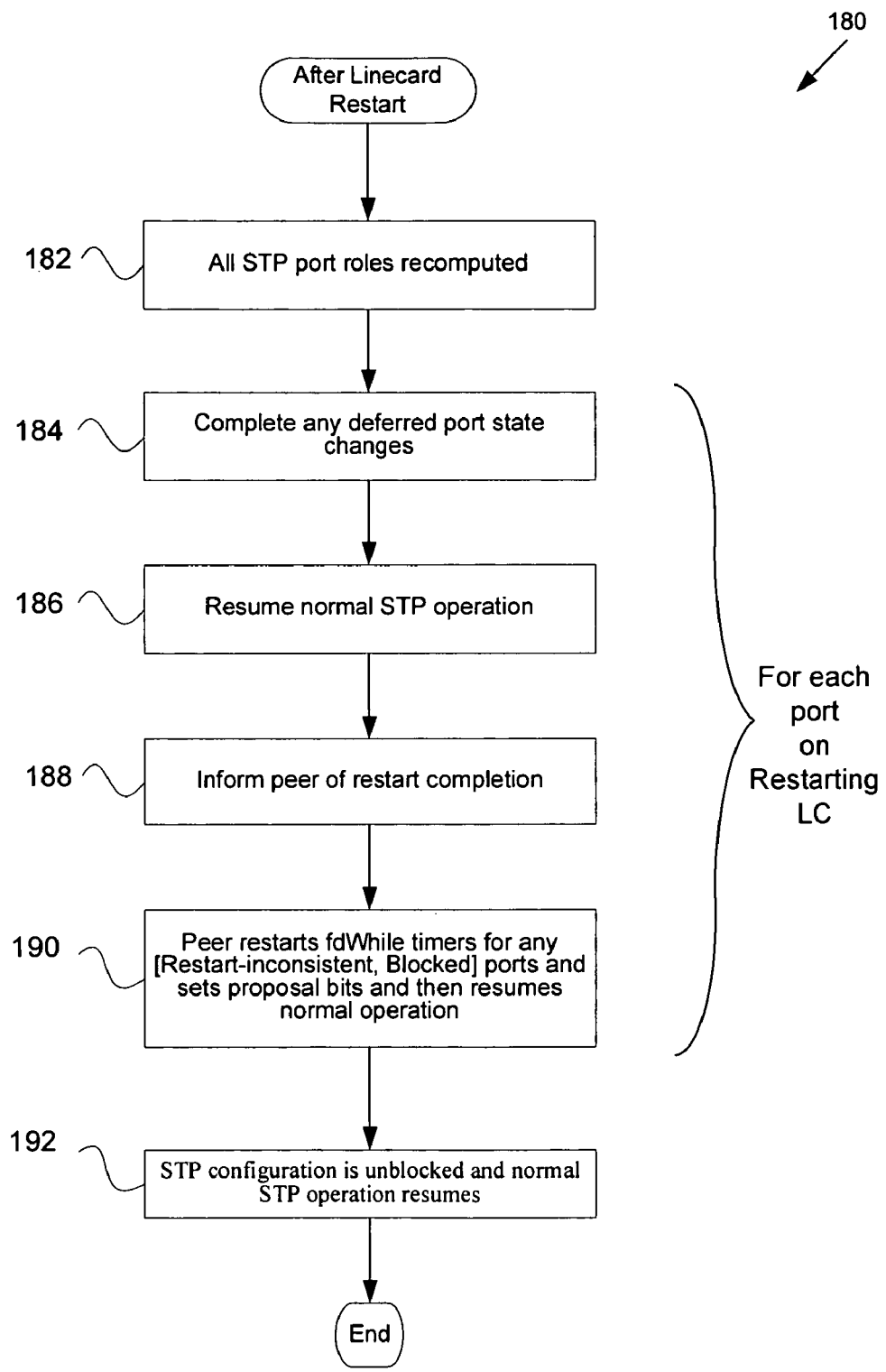
FIG. 1C is a flowchart illustrating a Seamless Restart procedure that is performed after a linecard restart is complete in accordance with one embodiment of the present invention.

Embodiments of the present invention include a first implementation for handling a restarting linecard and a second implementation for handling a restarting single supervisor. FIGS. 1A~1C describe techniques for handling a linecard restart, while FIGS. 4A~4C describe techniques for handling a single supervisor restart. Although the illustrated embodiments are described herein as applicable to "linecards" and "supervisor" of a switch, of course, these techniques may be applied to any type of restarting network device, such as a router, and any configuration of hardware in which layer 2 port states are temporarily unalterable by STP or the STP software/hardware for controlling such ports is temporarily unavailable during the restart.

During restart of a linecard, STP control software continues to execute on the supervisor with a few modifications as outlined below, for example, with respect to FIG. 1B. Since the supervisor and its STP control software is executing during restart, a port state change may be required by the STP. That is, a port state change may be initiated by the STP process. In general, some of the changes are deferred and other changes are handled by a port on a switch that is a neighbor to the restarting linecard.

FIG. 1A is a flowchart illustrating a Seamless Restart procedure 100 that occurs before a linecard planned restart in accordance with one embodiment of the present invention. Initially, it is determined whether a planned restart is imminent in operation 102. A planned restart may be initiated by a user starting a software upgrade process for a linecard. For instance, the user may also initiate the seamless restart mechanism of FIGS. 1A~1C through issuing a command or starting execution of a seamless restart software program for linecards. For example, during initiation of a software upgrade, the user may be presented with an option to execute a seamless restart program or such program may execute automatically upon initiation of the software upgrade.

When a planned restart is about to occur, it is then determined whether the peer of each port of the restarting linecard is Seamless Restart capable in operation 104. That is, it is determined whether a switch that is a neighbor to the restarting switch can implement the techniques described herein to prevent loops and minimize connectivity disruptions that may occur during the restart. In one implementation, each restarting port sends a query to its neighbor port asking whether the neighbor is Seamless Restart compatible. The neighbor may reply in the positive or negative or fail to respond. Only if the neighbor gives a positive response to the query is the neighbor deemed to be Seamless Restart compatible. Otherwise, it is deemed to not be Seamless Restart compatible.

The following operations 106 through 112 are performed for each port. If a port is Portfast, the port's state is maintained in operation 106. Portfast ports are positioned on the edge of the switch network (i.e., Portfast ports are not coupled to other switches). As a result of being on the edge, Portfast ports can always stay in forwarding state because they cannot cause loops. It may be determined whether each port is Portfast by checking a Portfast field for each port. A Portfast port's state can be maintained. Otherwise, if a port is shared, this port is blocked in operation 108. Shared ports can be coupled to two or more switches and it may not be possible to determine whether all of the shared switches are seamless restart capable and implement the techniques of the present invention in cooperation with the shared neighbor switch. Accordingly, shared ports of the restarting linecard are blocked. It may be determined whether a port is shared by checking a Shared field for the port.

Else if the port's peer is not Seamless Restart capable, this port is blocked in operation 110. Else if the port's peer is Seamless Restart capable, the state of the port is maintained and the peer is informed of the restart in operation 112. Thus, some of the ports of the restarting linecard can stay forwarding under certain conditions. In one implementation, the peer or neighbor is informed that a restart is imminent, the kind of upgrade (e.g., linecard or single supervisor), and completion of the restart (when that occurs). Any pending states changes are then completed before restart and any STP configuration is blocked during the restart in operation 114. The STP configuration that is blocked or prohibited during the restart may include any user configurations on the restarting line cards and its ports.

FIG. 1B is a flowchart illustrating a Seamless Restart procedure 150 that is performed during a linecard restart in accordance with one implementation of the present invention. In general, the supervisor software or software that controls STP continues to run with the following modifications. Initially, all blocked ports of the restarting linecard are excluded from the STP root computation in operation 154. In STP, a root switch is defined in a network of switches, and the ports of each non-root switch are assessed to determine a most cost effective path to reach the root switch which in turn becomes the root port. To illustrate in FIG. 3B, the port 308b of switch3 306 has an associated cost of 2 (through ports 304b and 304a of switch2 304) to the root switch1 switch1 302, while the other port 308a of switch 306 has a higher cost of 3 for the path to the root switch 302. Normally, the best cost port (308b) of switch3 306 would be selected as the "root" port for the switch3 306.

However, since this port 308b belongs to a restarting linecard and is blocked during restart, selecting this port 308b as a root port would result in a blocked path to the root switch1 302. Since it is preferable to have forwarding paths to the root switch to maximize connectivity and restarting ports may be blocked during the entire restart, pathways that include a restarting port are not used to determine the most cost effective path to the root switch.

Referring back to FIG. 1B, it is then determined whether a port state change has been initiated for the restarting linecard in operation 155. For example, has a network change occurred that results in a change in a restarting port's state for any reason, such as preventing a loop. If a restarting port state change has not been initiated, it is simply determined whether restart has completed in operation 170 and the process jumps back to operation 155.

In STP, a port may have one of five states: disabled, blocking, listening, learning, and forwarding. Transitions to and from a disabled state only occur when the port is enabled or disabled. Since a restarting port cannot be disabled or enabled during a restart, this transition does not occur during a restart. A port can change state from blocking to forwarding, and visa versa. The learning state is a transient state between blocking and forwarding, and transition to a learning state can only occur from a blocking state.

Referring to the FIG. 1B, if a port state change has been initiated, it is then determined whether the port state change is from forwarding to blocking in operation 156. If the port is not changing from forwarding to blocking, then is assumed that is undergoing one of the following state transitions:

(blocking to forwarding) or (learning to forwarding) or (blocking to learning) or (learning to blocking). For example, a port's role may have changed from Alternate/Backup to Designated, which may result in a state change on a restarting port from blocking to forwarding. In another example, completion of a SYNC operation or forward delay timeout may result in a change of blocking to forwarding on a restarting port. Since a restarting port's state cannot be changed and leaving the port in a blocking or learning state will not result in a loop, blocking/learning to forwarding/blocking/learning port changes are deferred until completion of the restart in operation 158.

If the port state change is from forwarding to blocking, it is then determined whether this port state change has occurred as a result of a role change in operation 160. For example, it is determined whether a re-rooting operation has occurred. That is, a root or designated port changes to an alternate port. FIGS. 2A through 2F illustrate Seamless Restart mechanisms for handling a role change of a restarting port, which would have resulted in a state change of blocking if the port was not restarting, in accordance with one implementation of the present invention.

Figure 2A:
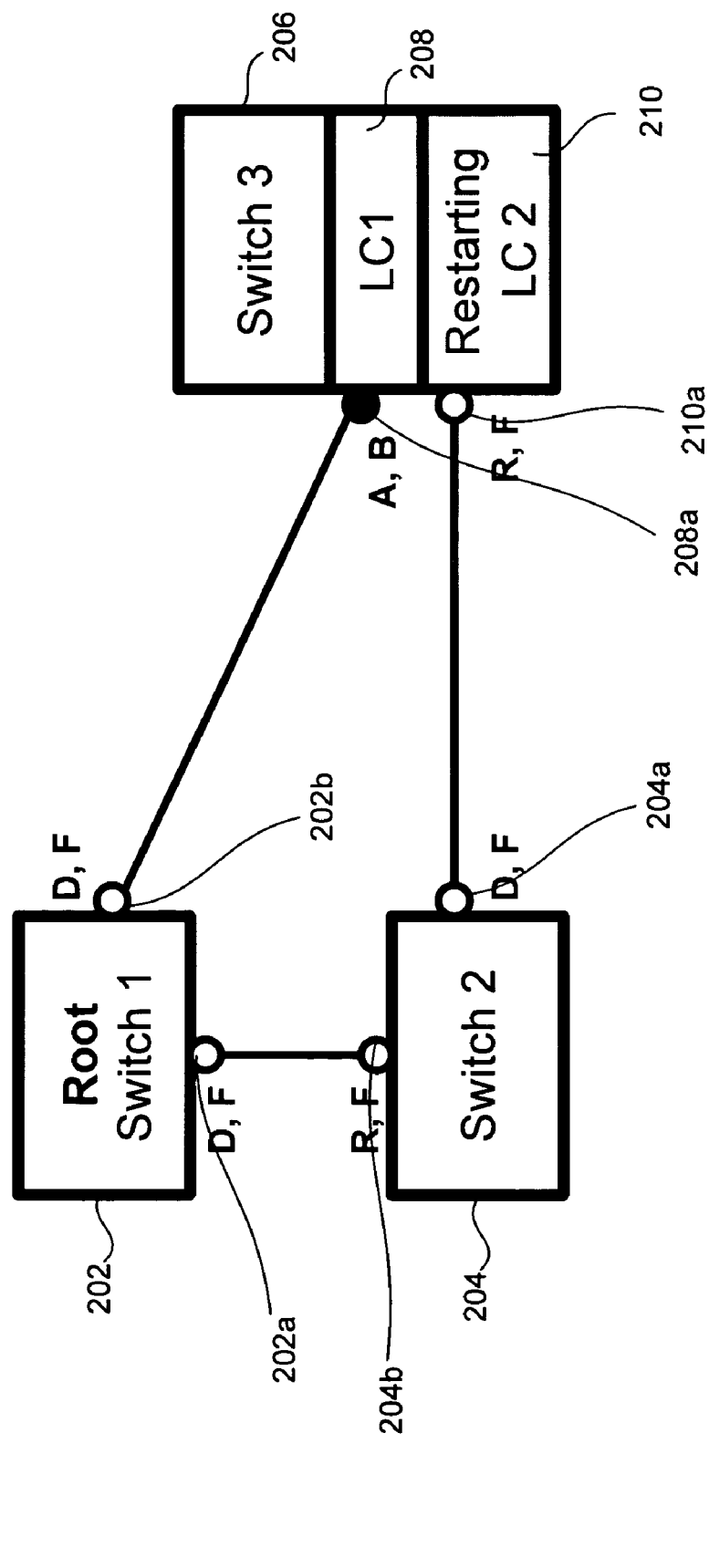

FIG. 2A shows a network 200 of three switches: root switch1 202, switch2 204, and switch3 206. These three switches each include one or more ports having certain roles and states prior to restart of the linecard 208 of switch3. Root switch1 includes port 202b having a designated (D) role and a forwarding (F) state that is coupled to port 208a (of switch3) having an alternate (A) role and a blocked (B) state. Root switch1 also includes port 202a having a designated (D) role and a forwarding (F) role that is coupled to a port 204b of (switch2) having a root (R) role and a forwarding (F) state. Switch2 also includes port 204a having a designated (D) role and a forwarding (F) state coupled to port 210a (of switch3) having a root (R) role and a forwarding (F) role. The linecard 210 of switch3 then restarts. Accordingly, the port 210a of the restarting linecard 210 is left in the forwarding state since this port 201a is not sharing and its peer is Seamless Restart capable.

Figure 2B:
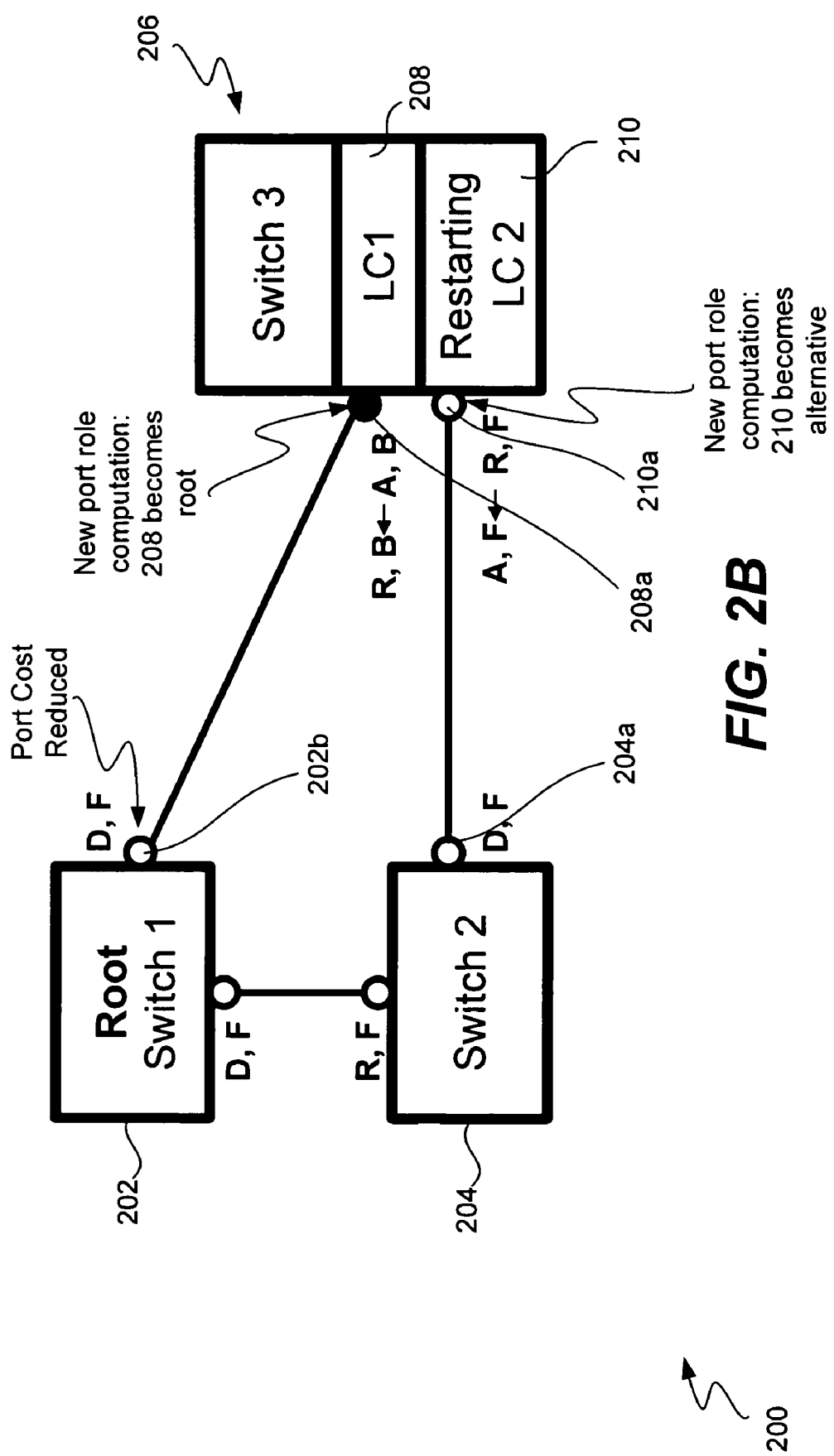
Figure 2C:
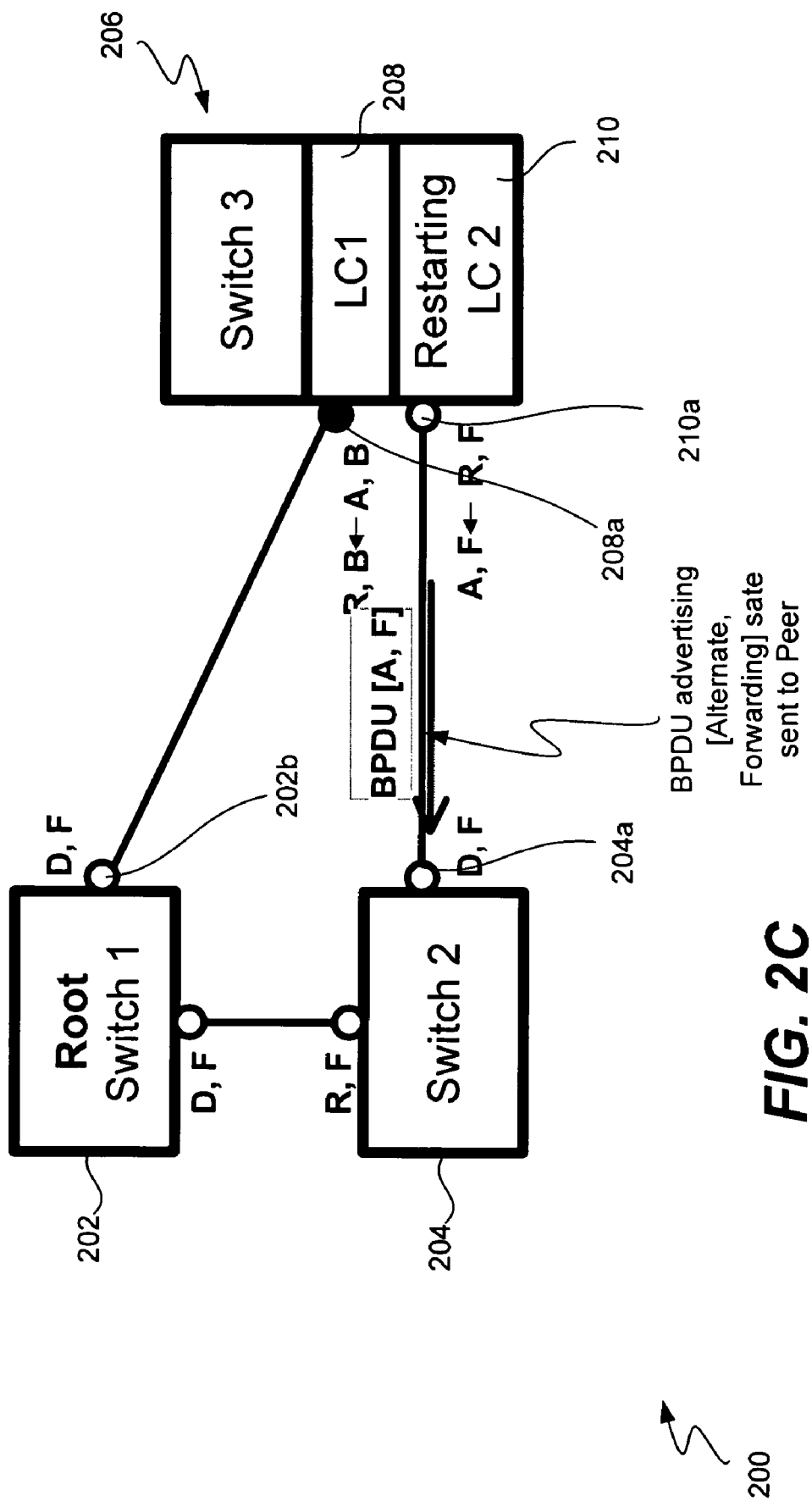

FIG. 2B illustrates the switch network 200 of FIG. 2A after restart has commenced and prior to completion of restart. As shown, the port cost of port 202b of the root switch1 has been reduced, resulting in a role change to port 208a of switch3. Port 208a undergoes a role change from Alternate (A) to Root (R). Accordingly, the restarting port 210a undergoes a role change from Root (R) to Alternate (A). It then becomes necessary for the new root port 208a to become forwarding so as to perform its root role without loss of connectivity. This port state change for port 208a would entail that port 210a would become blocking before port 208a performs its state change so as to prevent a transient loop. Returning to the illustrated procedure of FIG. 1B, if such a role change would result in a restarting port changing from forwarding to blocking, the state changing port of the restarting linecard sends a BPDU message (see FIG. 2C) to its peer advertising its state (e.g., [Alternate, Forwarding] in the illustrated example) and identifying its new root peer, etc. in operation 162.

Figure 2E:
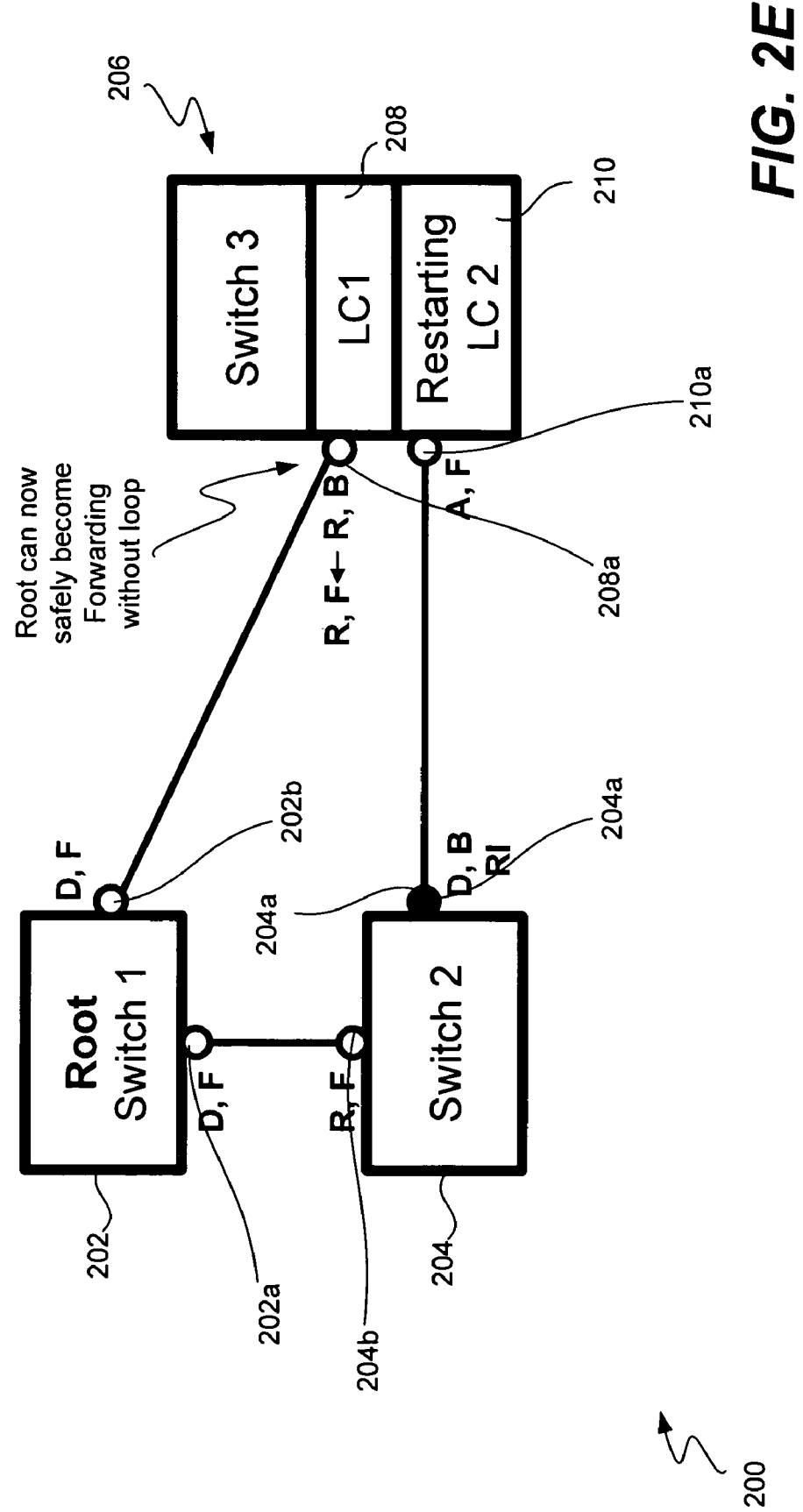

In response to the BPDU from the restarting port, the peer than marks itself as Restart-Inconsistent (RI) and sets its state to blocking (B) in operation 164 as shown in FIG. 2D. In other words, the peer or neighbor blocks itself in place of the restarting port. The peer than responds back to the advertising port with a BPDU conveying its new state (D, B, RI) in operation 166 as shown in FIG. 2D. As shown in FIG. 2E, the peer port 204a is now blocking (B), and accordingly, the root port 208a can now change its state to forwarding (F) as part of a normal STP operation to have root ports in a forwarding state and not cause a transient loop (i.e., in the path between port 208a, 210a, 204a, 204b, 202a, 202b, and back to 208a).

Referring back to FIG. 1B, it is then determined whether the restart has completed in operation 170. If the restart has not completed, the process jumps back to operation 155. When a port changes from forwarding to blocking and this change is caused by a SYNC operation, several actions occur in operation 168 to prevent loops, which are illustrated in FIGS. 3A-3D. FIG. 3A through 3D illustrating Seamless Restart mechanisms for handling a SYNC operation with respect to a restarting port, which would have resulting in a state change blocking if the port was not restarting, in accordance with another implementation of the present invention.

Figure 3A:
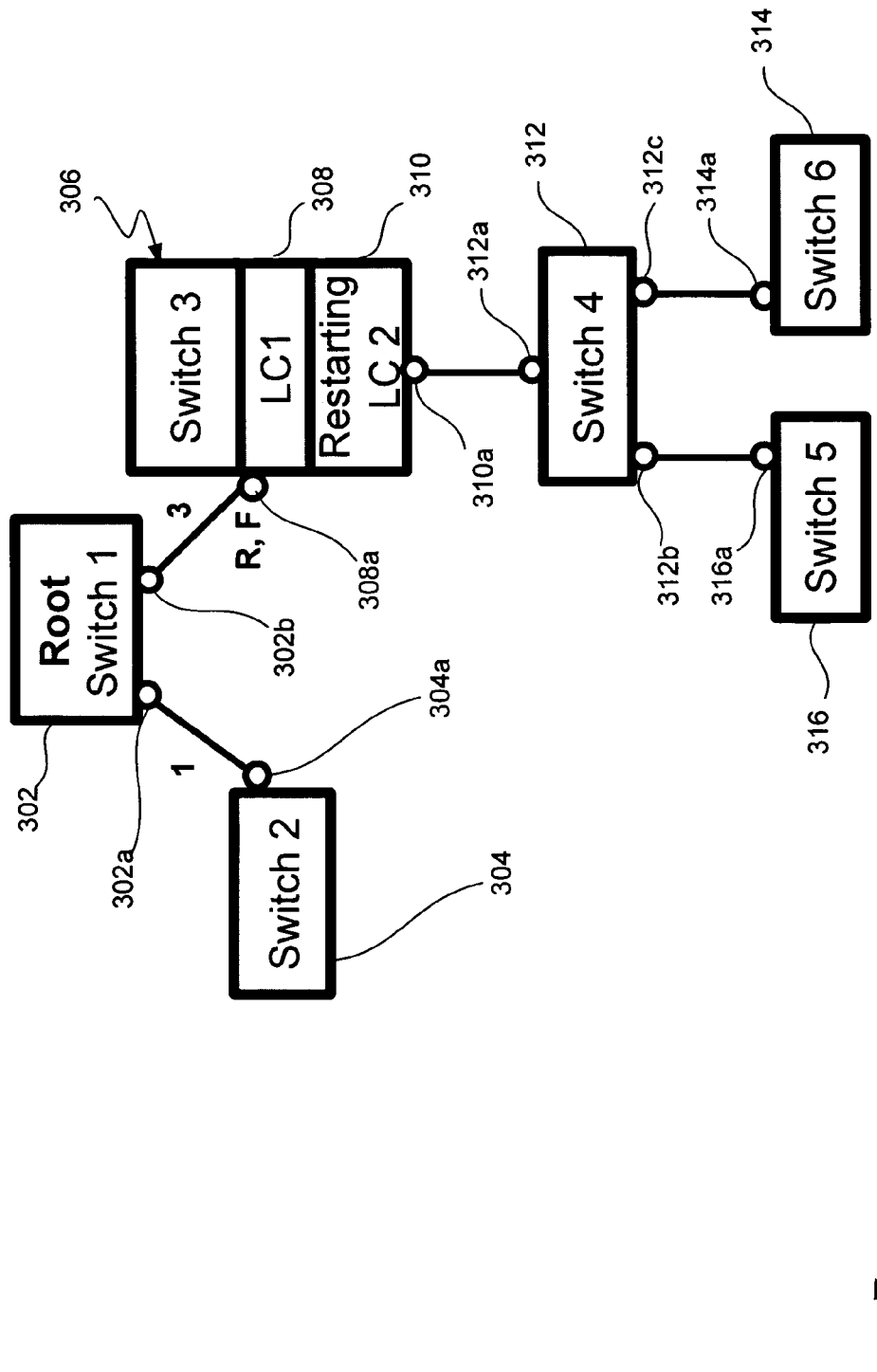
FIG. 3A through 3D illustrating Seamless Restart mechanisms for handling a SYNC operation with respect to a restarting port, which would have resulting in a state change to blocking if the port was not restarting, in accordance with another implementation of the present invention.

FIG. 3A illustrates a switch network 300 that includes switches 1 thorough 6 which are labeled with reference numbers 302, 304, 306, 312, 316, and 314, respectively. Each switch has one or more ports. For example, switch1 302 includes ports 302a and 302b. Switch2 304 includes port 304a. Switch3 306 includes port 308a for linecard 308. Switch4 312 includes ports 312a-312c. Switch5 includes port 316a, and switch6 included port 314a. Switch3 is also shown to include a restarting linecard 310, as well as a non-restarting linecard 308. Prior to commencement of the restart in switch3, all the ports of network 300 are in forwarding (F) state, which is illustrated by "white" port circles, and port 308a of linecard 308 of switch3 has a root (R) role.

Figure 3B:
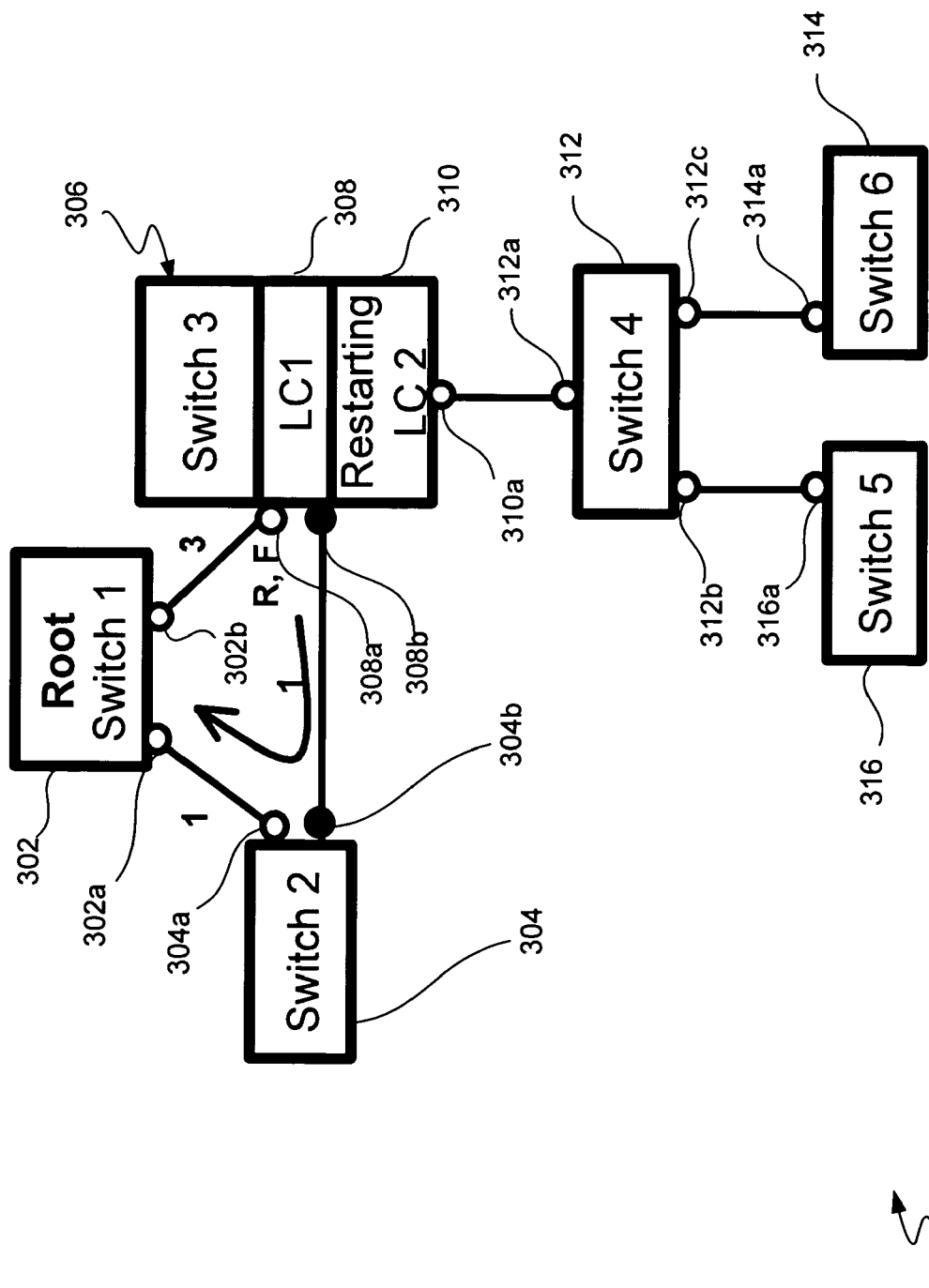

During restart of linecard 310 of switch3, FIG. 3B illustrates the addition of a link. between new port 308b of switch3 and new port 304b of switch2. Both new ports 308b and 304b of the new link are initially in a blocking (B) state, which are illustrated as "black" port circles. This additional link results in a better routing path from switch3 to switch1 through ports 308b, 304b, 304a, and 302a having cost equal to 2 (1+1), as opposed to a route through ports 308a and 302b having cost equal to 3.

Figure 3C:
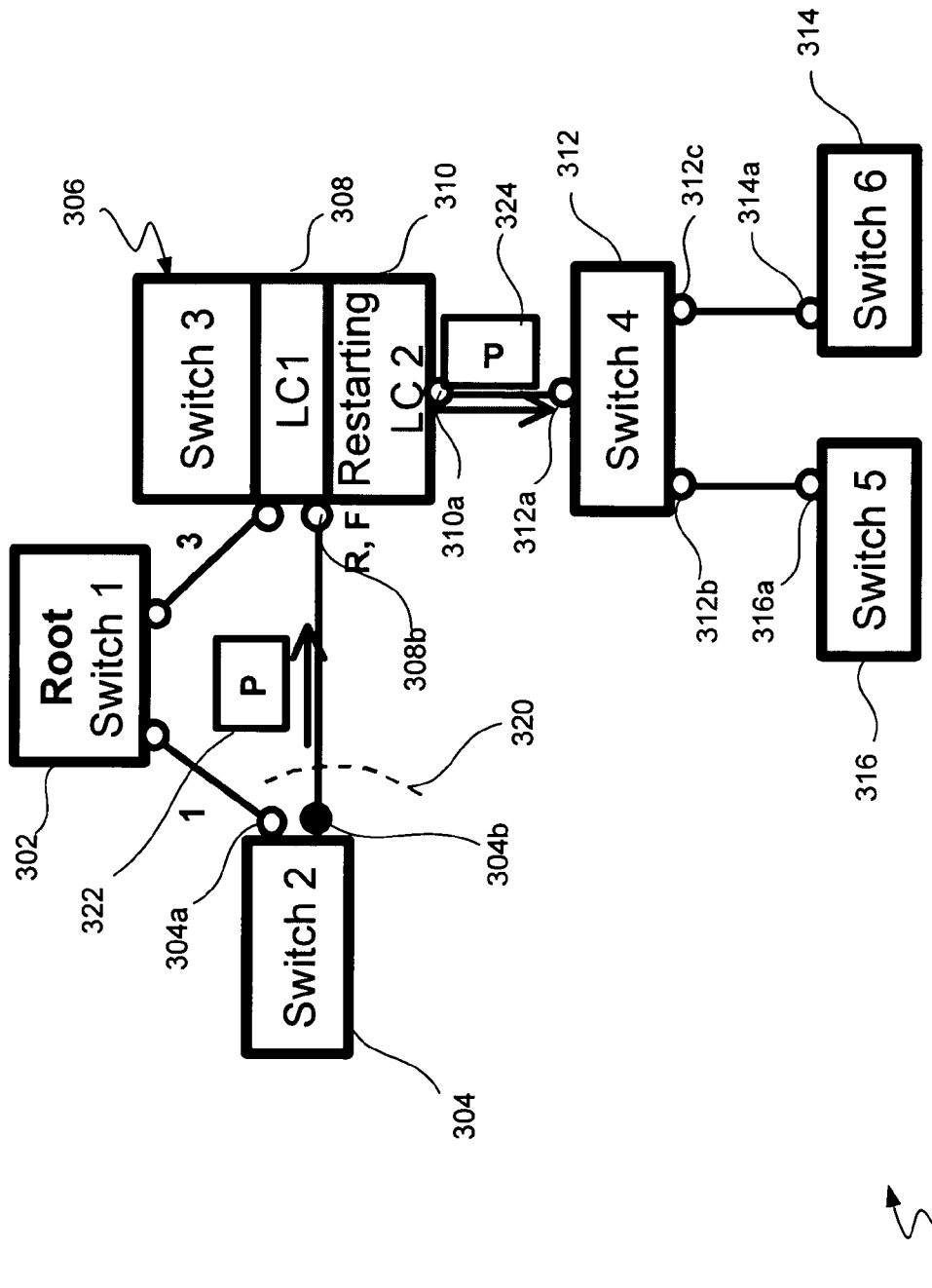
Figure 3D:
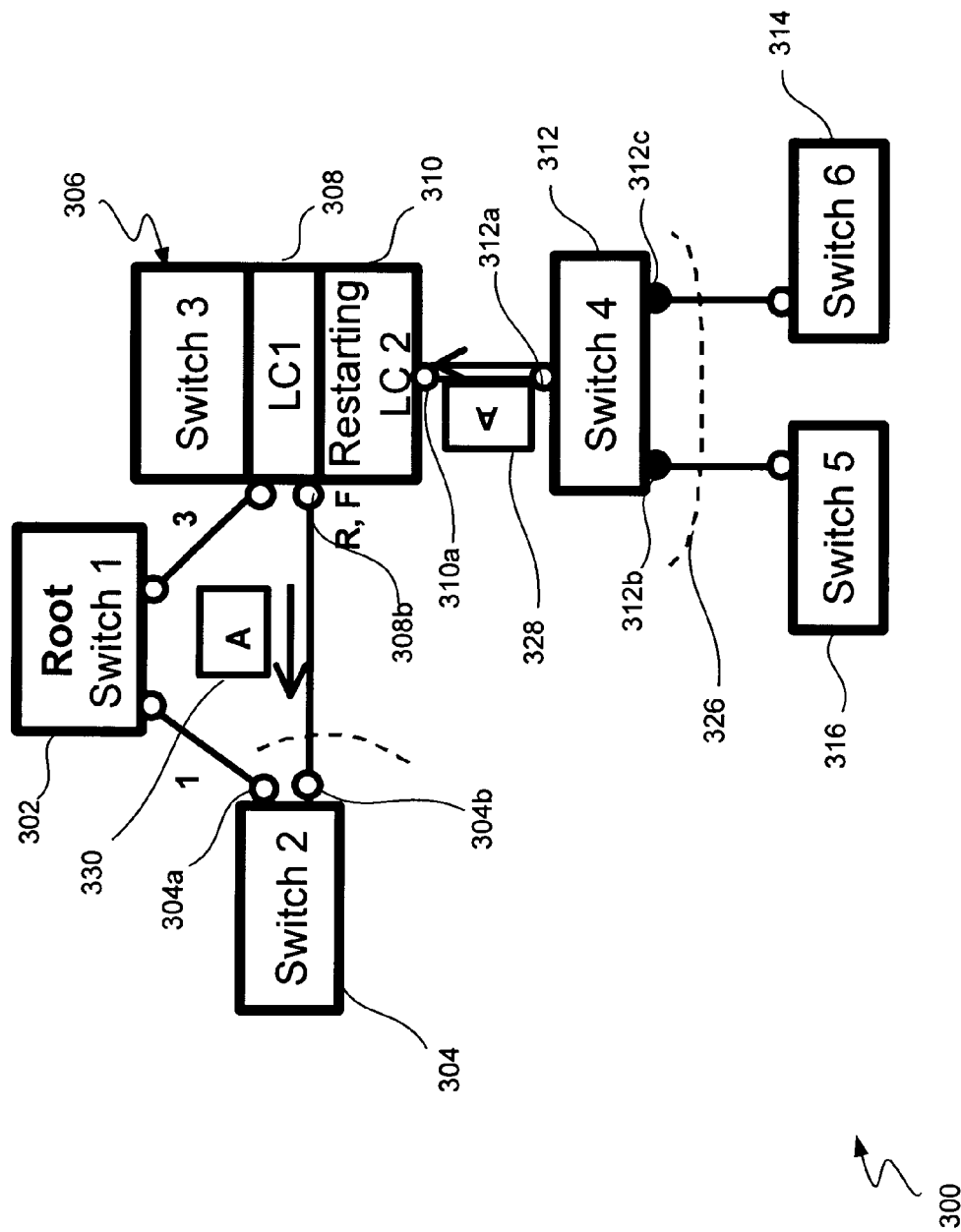

In order to rapidly move this new designated port 304b to forwarding state, a SYNC operation may be performed as part of the 802.1W Rapid Spanning Tree protocol specification. For SYNC operations that occur when there is not a restart in progress, this SYNC operation would involve switch2 performing a handshake with switch 3. As part of this handshake, a proposal is sent from switch2 to switch3. Switch3 on receiving this proposal will block all its designated forwarding ports (310a) and having done so, send back an agreement to switch2 which on receiving the agreement, can move port 304b to a forwarding state right away. This can be done without danger of transient loops because switch2's port roles and states are is in sync with switch3 (since they have performed a handshake), and switch3's forwarding path is cut off (as a result of the blocking of its designated ports in the previous step) from its downstream switches (switch4) which may not be in sync. Next, switch3 will perform a similar handshake with all its downstream neighbor switches (switch4) to make its designated ports forwarding again. In this manner the cut in forwarding path originally on port 304a will propagate through the network [304b to 310a to (312b & 312c)] till it reaches the end of the network. This procedure guarantees that there will be no transient loops The Seamless Restart handles this handshake in a different way than when a restart is not occurring with a handshaking switch's linecard. When a restart is occurring, the Seamless Restart process, in effect, moves a restarting port's cutoff operations to a neighbor's port. As shown in FIG. 3C, the new port 304b of switch2 sends a proposal (P) 322 to new port 308b of linecard 308 of switch3 306, while port 304b remains in a blocking (B) state to form cut 320 to thereby cut off the new link from the rest of the network (e.g., from switch 1 or other switches that are not shown). When a restart is not in process, the switch 306 would normally block its ports to its neighbor switches. That is, port 310*a* would be blocked. However, since this port 310*a* belongs to a restarting linecard 310, it cannot change its state and be blocked. Accordingly, the proposal (P) 324 is forwarded from restarting port 310*a* to port 312*a* of neighbor switch4 312.

In response to this proposal (P) 324, switch4 blocks ports 312*b* and 312*c*. As shown, blocking these ports forms a cut 326 which cuts off the neighbor switches of switch4. Switch4 then sends an agreement (A) 328 (see FIG. 3D) from port 312*a* to port 310*a* of switch3. When switch3 gets the agreement (A) 328 from switch4, switch3 can then send an agreement (A) 330 from port 308*b* to port 304*b* of switch2, which can then move to a forwarding state right away. Switch4 will continue the SYNC as usual to unblock its ports.

Referring back to FIG. 1B, it is then determined whether the restart has completed in operation 170. When a restart completes, the procedure 150 ends. Otherwise the process jumps back to operation 155 where it is again determined whether a state change is initiated.

FIG. 1C is a flowchart illustrating a Seamless Restart procedure 180 that is performed after a linecard restart is complete in accordance with one embodiment of the present invention. Initially, all STP port roles are recomputed in operation 182. The following operations 184-190 are performed for each port on the restarting linecard. In operation 184, any deferred port state changes are completed. For example, a restarting port state change from blocking to forwarding that occurred during restart and deferred is now performed. Normal STP operation with is resumed with respect to each port in operation 186. Each port's peer is also informed of the restart completion in operation 188. In response to the restart completion, the peer restarts its forward delay (fdWhile) timers for any [Restart-Inconsistent, Blocked] ports and sets proposal bits and then resumes normal operation in operation 190. The forward delay timer is restarted so that ports blocked during restart may become forwarding on expiration of the timer. The proposal bit is set so that the blocked ports may do a SYNC and become forwarding using the 802.1w rapid transition.

As shown in FIG. 2F, port 210 of restarting linecard 210 which has an Alternate role is blocked (B), while port 204*a* of switch2 which has a Designated role and is marked as Restart-Inconsistent starts its forward delay timer and sets the proposal bit in its BPDU and will becomes forwarding (F) eventually as normal STP operation. Once the operations 184-190 are completed for all the ports on the restarting linecard, STP configuration is unblocked and normal STP operation resumes in operation 192. The procedure 180 ends.

Techniques may also be implemented to handle a Layer 2 MAC flush for a restarting linecard. When layer 2 information is received into a particular port, a MAC Address Learning Table is updated in the receiving port. That is, when a MAC address is received on a port, this received MAC address is learned and saved in a MAC Address Learning Table for such port. When packets having an already learned MAC address are not received for a predetermined duration of time, the corresponding MAC address is aged out of the appropriate MAC Address Learning Table, for example, after 300 seconds typically.

During a SPT topology change, the MAC Address Learning table is typically flushed in order to unlearn any wrong paths. Of course, during a restart a topology change can also occur and there is a need to flush the MAC Address Learning Table. However, this flush cannot be done during restart for the ports of the restarting linecard since this type of control is unavailable in a restarting card. In one embodiment, the aging timer is set to a short value (e.g., 10 seconds) before the restart. This resetting of the aging timer may result in black holing during the age time (10 sec) if there is a topology change; however, the period of risk is very brief compared to the default 300 seconds and would unlikely result in significant disruption of traffic. Black holing may occur if a MAC table is incorrect and data is sent to a wrong destination. The Seamless Restart procedures for a restarting linecard may also be applied to various other scenarios, such as a link being added or removed during the restart, a root failure, a root change, etc.

When there is no topology change in the network during a linecard restart, the Seamless Restart embodiments of the present invention provide several advantages. For instance, seamless restart of a linecard allows normal STP operation on a restarting linecard switch and their peer switches. Additionally, there is no need to change port state or flush layer 2 MAC tables. Also, no topology change or loops are generated by the restarting linecard. Finally, layer 2 data paths can stay forwarding in a restarting linecard if they are not shared and neighbor ports are Seamless Restart capable.

When a topology change occurs in the network during a restart of a linecard, several advantages are also associated with Seamless Restart. If the restarting linecard has to move a port from a Forwarding to Blocking state to break a loop, the peer port on its neighbor switch will move its state to Blocking to break the loop. Also, if the restarting linecard has to move a port from Blocking to Forwarding, it will defer this state change so as not to inadvertently create loops, while sacrificing connectivity. In sum, the layer 2 data path stays forwarding, except in the case when there is no forwarding data path available.

Seamless Restart mechanisms for a restarting single supervisor are also contemplated here. A single supervisor refers to a single supervisor in the switch, as opposed to redundant supervisors. Redundant supervisors would typically not cause a disruption if their state is synchronized. In general, when a switch's single supervisor software (or any other suitable STP control software) is restarting, STP control software is not executed on the entire switch during the restart.

Figure 4A:
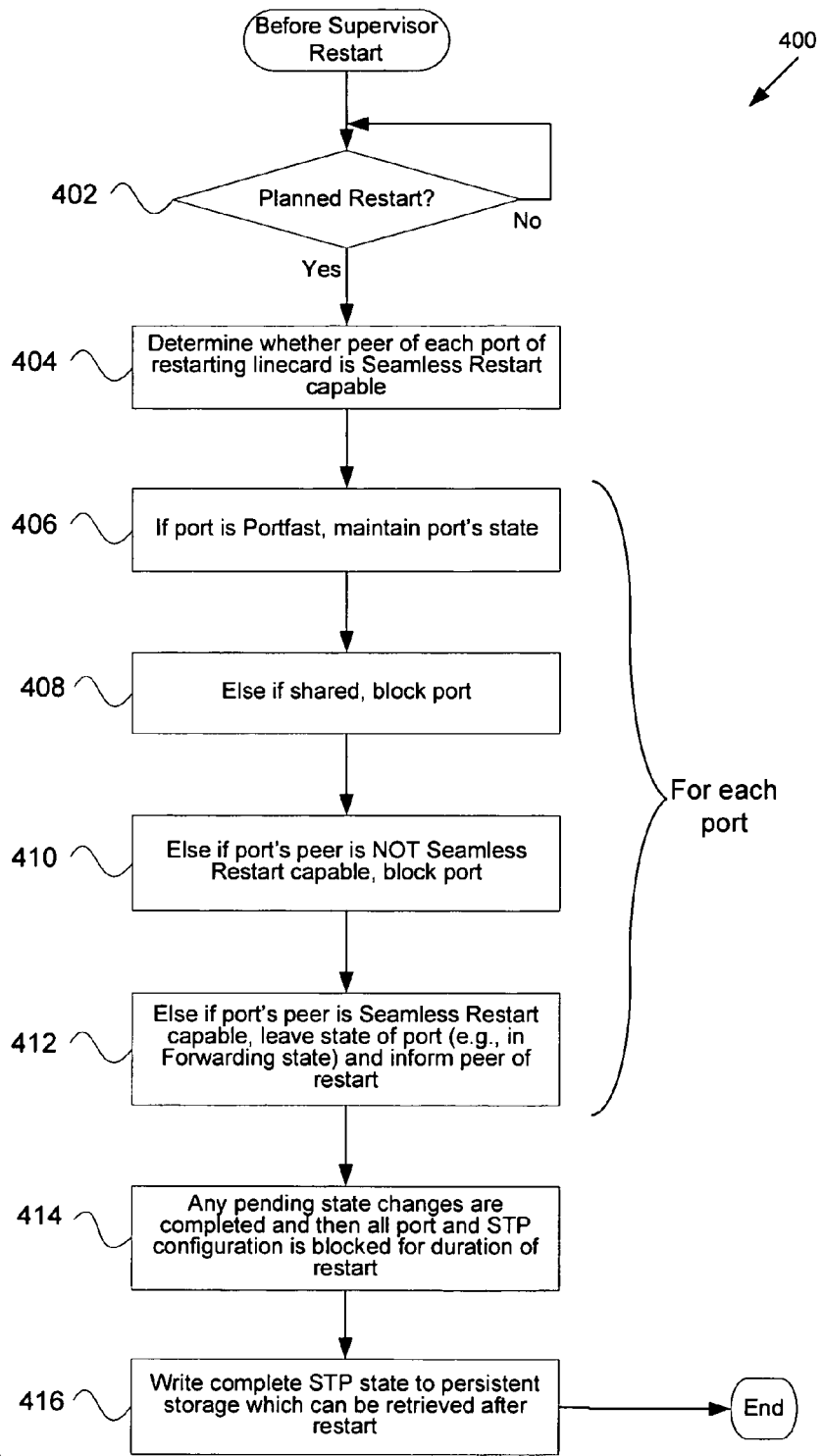
FIG. 4A is a flowchart illustrating a procedure for a Seamless Restart for a single supervisor in accordance with one embodiment of the present invention.
Figure 4B:
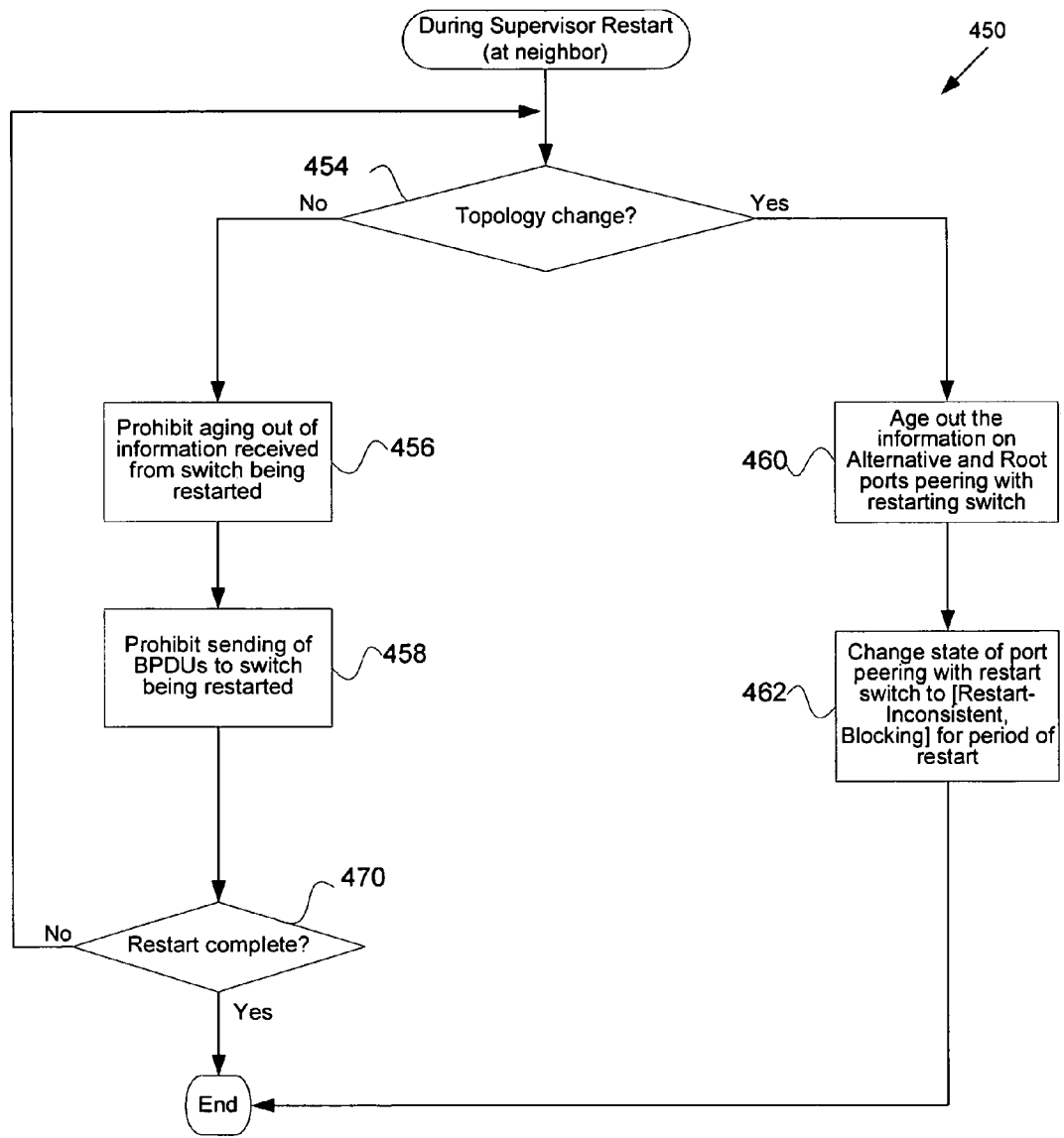
FIG. 4B is a flowchart illustrating a Seamless Restart procedure that is performed during a single Supervisor Restart from the perspective of a neighbor switch in accordance with one embodiment of the present invention.
Figure 4C:
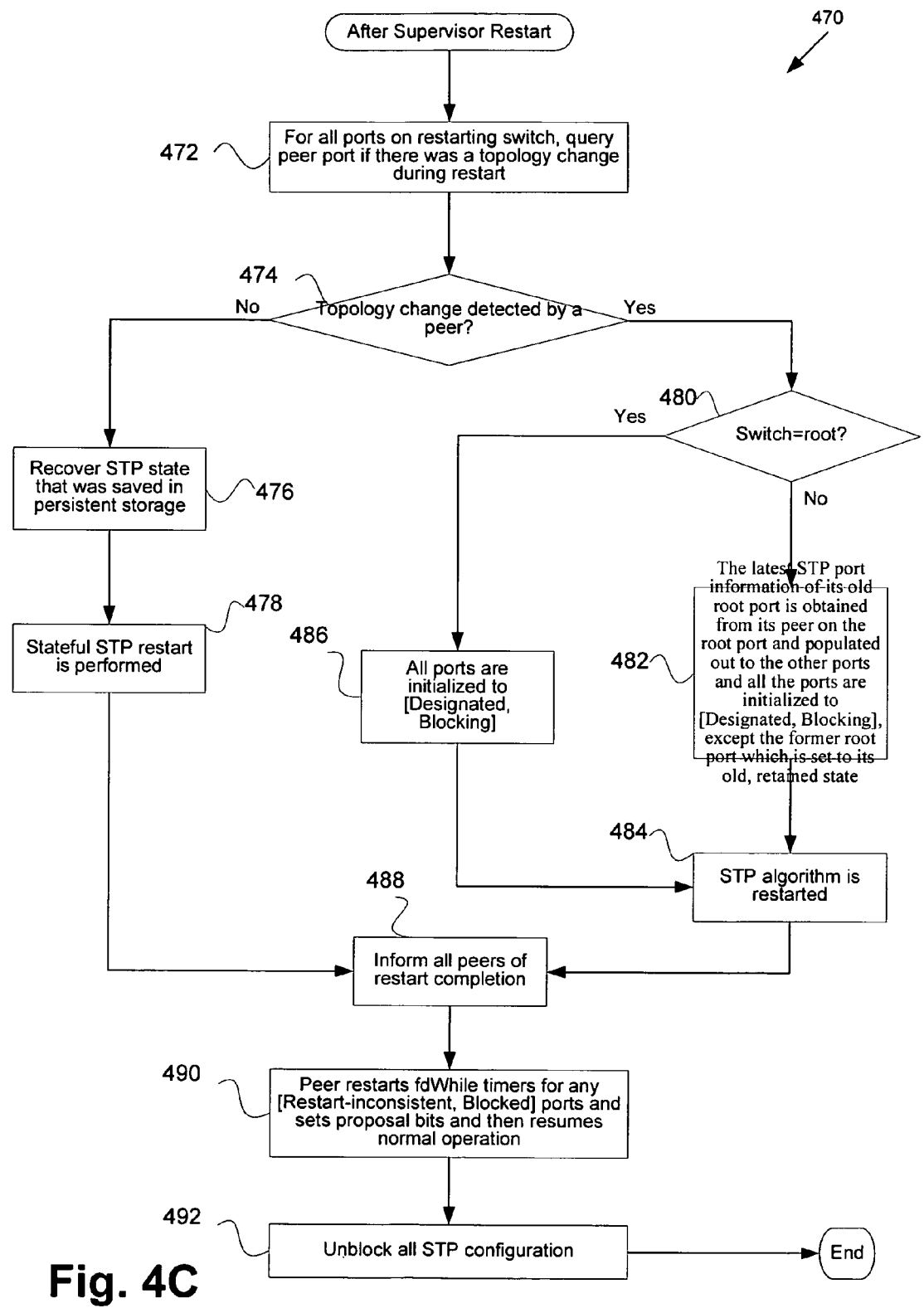
FIG. 4C is a flowchart illustrating a Seamless Restart procedure that is performed after a Supervisor Restart in accordance with one implementation of the present invention.

FIGS. 4A through 4C illustrate a Seamless Restart mechanism, divided into three time frames: before, during, and after restart. FIG. 4A is a flowchart illustrating a procedure 400 for a Seamless Restart of a single supervisor in accordance with one embodiment of the present invention. The operations of FIG. 4A are similar to the operations of FIG. 1A. That is, operations 402 through 414 may be performed in much the same manner as operations 102 through 114, respectively, of FIG. 1A. The procedure 400, however, contains an additional operation 116 which includes writing or storing a complete STP state to one or more persistent storage device(s) that can be retrieved after the supervisor restart. The STP state information is retained since it would be lost during a supervisor restart. The use of this STP state information is explained further below with respect to FIG. 4C.

FIG. 4B is a flowchart illustrating a Seamless Restart procedure 450 that is performed during a single Supervisor Restart from the perspective of a neighbor switch in accordance with one embodiment of the present invention. Initially, it is determined whether a topology change has occurred in operation 454. For example, it may be determined whether a BPDU has been received that indicates a change in any root information.

When a topology change has not occurred, the neighbor prohibits aging out of the information received from the switch that is being restarted in operation 456. Thus, although the restarting switch is not executing STP and not sending out BPDU updates to its neighbor switches, the restarting switch's root information can be retained by the neighbor switch during the restart, which can be longer then the age timeout and can use the restarting switch for data forwarding.

The neighbor also prohibits sending of BPDUs to the switch that is being restarted in operation 458 since the restarting supervisor switch is not processing the BPDUs without its STP software running. This is an optimization and may be omitted. It is then determined whether the restart is complete in operation 470. If the restart is complete, the procedure then ends. Otherwise, the procedure 400 reinitializes and determines again if there is a topology change in operation 454. As long as there is no topology change, the neighbor switch (with respect to the restarting switch) continues to prohibit aging out of the information last received from the restarting switch and prohibit sending of BPDU to the switch.

If a topology change occurs, the information on the ports that are peering with the restarting switch is aged out in operation 460. The state of the port peering with the restarting switch is changed to [Restart-Inconsistent, Blocking] for the period of the restart in operation 462 and the procedure 400 then ends After the restart, the Restart-Inconsistent ports are preferably initialized to a designated role and a blocking state.

FIG. 4C is a flowchart illustrating a Seamless Restart procedure 470 that is performed after a Supervisor Restart in accordance with one implementation of the present invention. Initially, for all ports on a restarting switch, a peer port is queried to determine whether there was a topology change detected by the peer during the restart in operation 472. That is, the neighbor switch keeps a record of whether any topology changes have occurred during the restarting switch's restart procedure. For example, a Restart Topology Change flag is maintained in each neighbor switch. The Restart Topology Change flag is set to a default value of FALSE. When the neighbor is informed of a restart, it changes the Restart Topology Change flag to TRUE if a topology change is detected. The flag is changed back to FALSE after a query for topology change detection is received by the neighbor.

Based on the restarting port's query to the neighbor, it is then determined whether a topology change has been detected by the peer in operation 474. If no topology change has been detected, the STP state that was saved in the persistent storage is then recovered in operation 476. A stateful restart of STP is then performed in operation 478. During stateful restart STP process is started on the supervisor. STP control software's run-time data structures are created and initialized based on the recovered persistent state. For example, the port role and port state of a port is initialized based on what value is recovered from the persistent storage. Each port state of each port becomes what it was before restart and could be forwarding/blocking/learning/disabled and the port role is also what it was before restart and could be root/designated/alternate/backup. This way the software port state is in sync with the actual port state on linecards. This is different from a stateless restart where all ports are initialized to blocking state and designated Role, and hardware state if forced to be blocking.

If a topology change has been detected by the peer, it is then determined whether the restarting switch is a root in operation 480. For example, the restarting switch may be preconfigured as a root or be designated as a root based on its preconfigured priority value or some other variable. If the restarting switch is a root, all ports are initialized to [Designated, Blocking] in operation 486. If the switch is not a root, the latest STP port information of its old root port is obtained from its peer on the root port and populated out to the other ports and all the ports are initialized to [Designated, Blocking], except the former root port which is set to its old, retained state, in operation 482. For the root and non-root restarting switch, the STP algorithm is then restarted in operation 484.

All peers are then informed of the restart completion in operation 488. The peer then restarts its forward delay (fd-While timers) for any [Restart-Inconsistent, Blocked] ports and sets proposal bits and then resumes normal operation in operation 490. All STP configuration is unblocked These operations 488, 490, and 492 are similar to the operations 188, 190, and 192, respectively, of FIG. 1C. The procedure for 70 then ends.

Figure 5A:
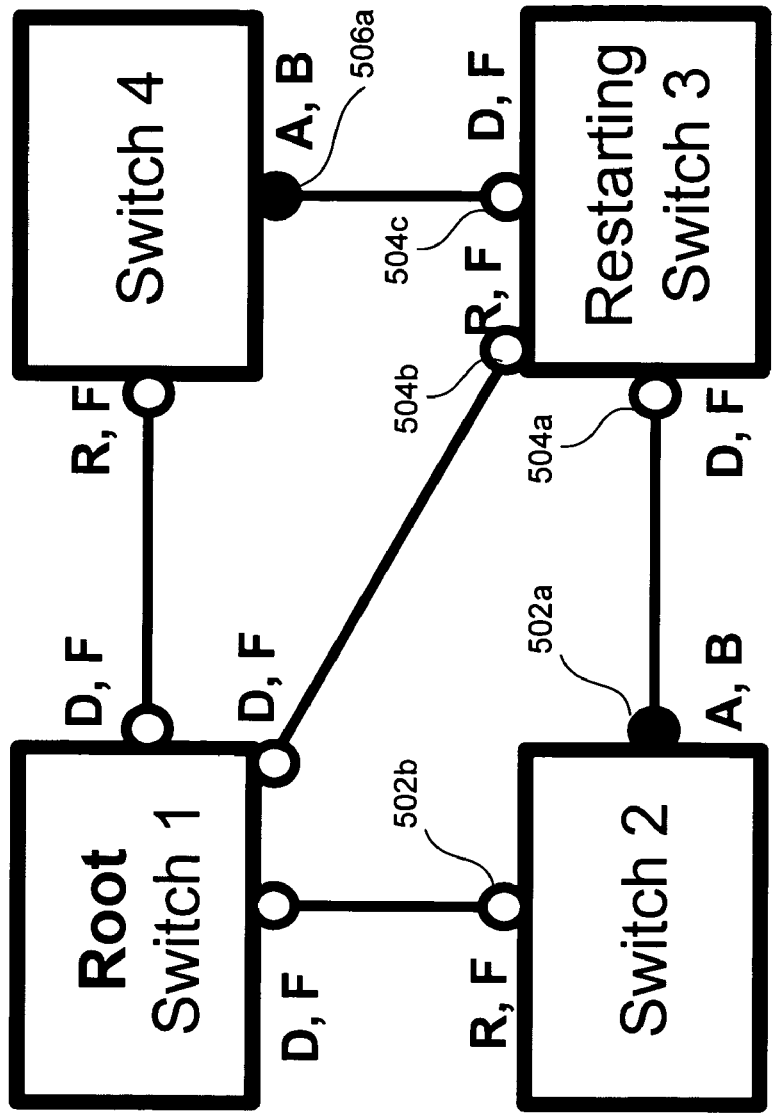
FIGS. 5A through 5D are diagrammatic representations of a switch network in which a Seamless Restart procedure is implemented for a restarting single supervisor, during which root priority is changed in the network.

FIGS. 5A through 5D are diagrammatic representations of a switch network 500 in which a Seamless Restart procedure is implemented for a restarting single supervisor, during which root priority is changed in the network. FIG. 5A depicts the network 500 prior to a restart. The network includes switch1, switch2, switch3, and switch4. Switch1 is the root switch prior to restart of switch3. The STP state of switch3 prior to restart of its supervisor is summarized as follows: port 504a is Designated (D) and Forwarding (F); port 504b is Root (R) and Forwarding (F); and port 504c is Designated (D) and Forwarding (F). Prior to restart, these STP states of switch3 are retained in persistent storage that is available to the restarting switch after completion of the restart.

Figure 5B:
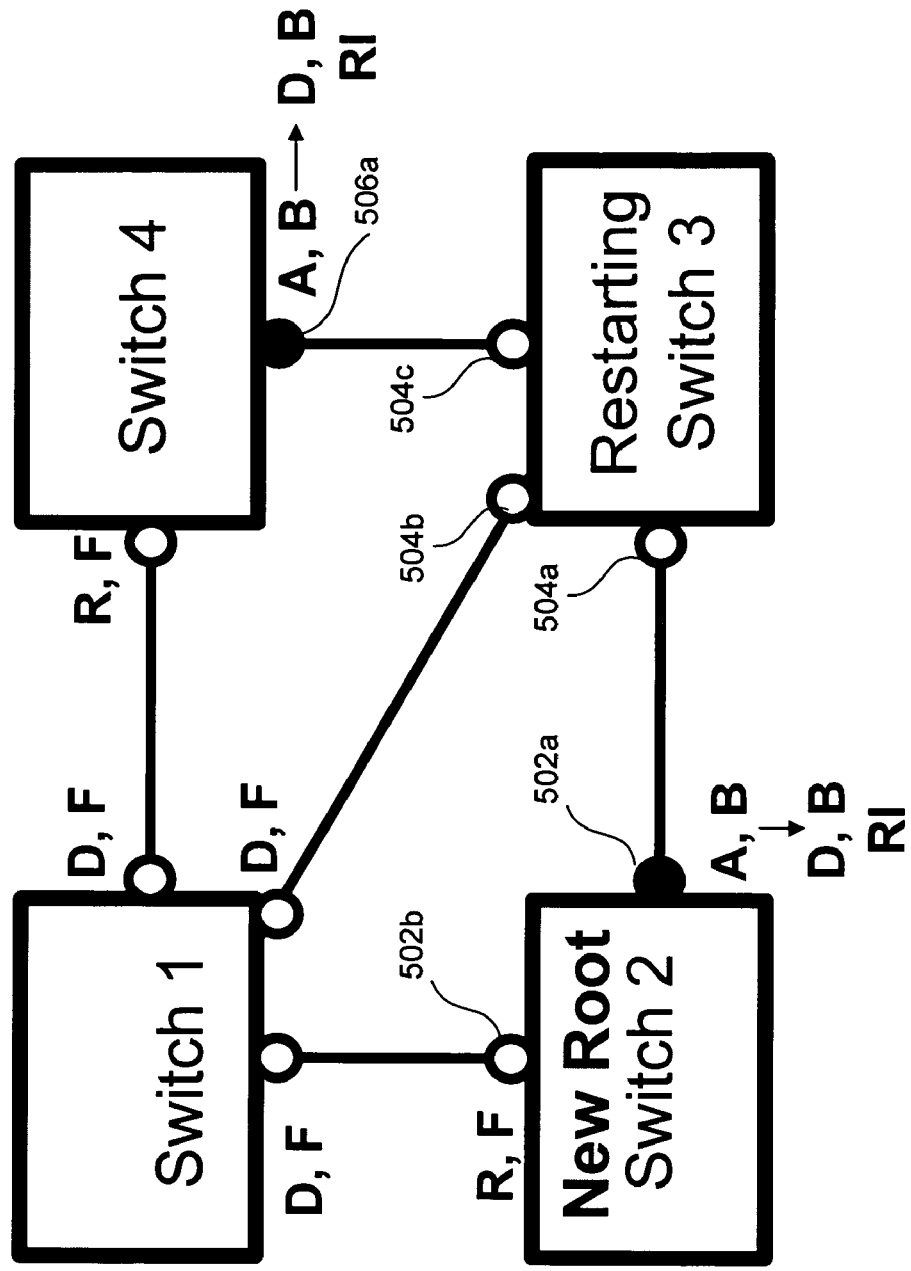

FIG. 5B illustrates the same network 500 after commencement of restart of the supervisor of switch3. As shown, the states of the restarting switch3 are lost. A topology change has also occurred. For example, switch1's priority has increased so that switch2 is to become the new root. Since a topology change has occurred, the switches that are the restarting switch's neighbors (switch4 and switch2) age out information from the restarting switch3. Additionally, the neighbor's ports that are peers to the restarting switch change their state to Blocking (B) and are marked as Restart-Inconsistent (RI). Thus, peer port 502a of switch2 and peer port 506a of switch4 change their states to [D, B, RI]

Figure 5C:
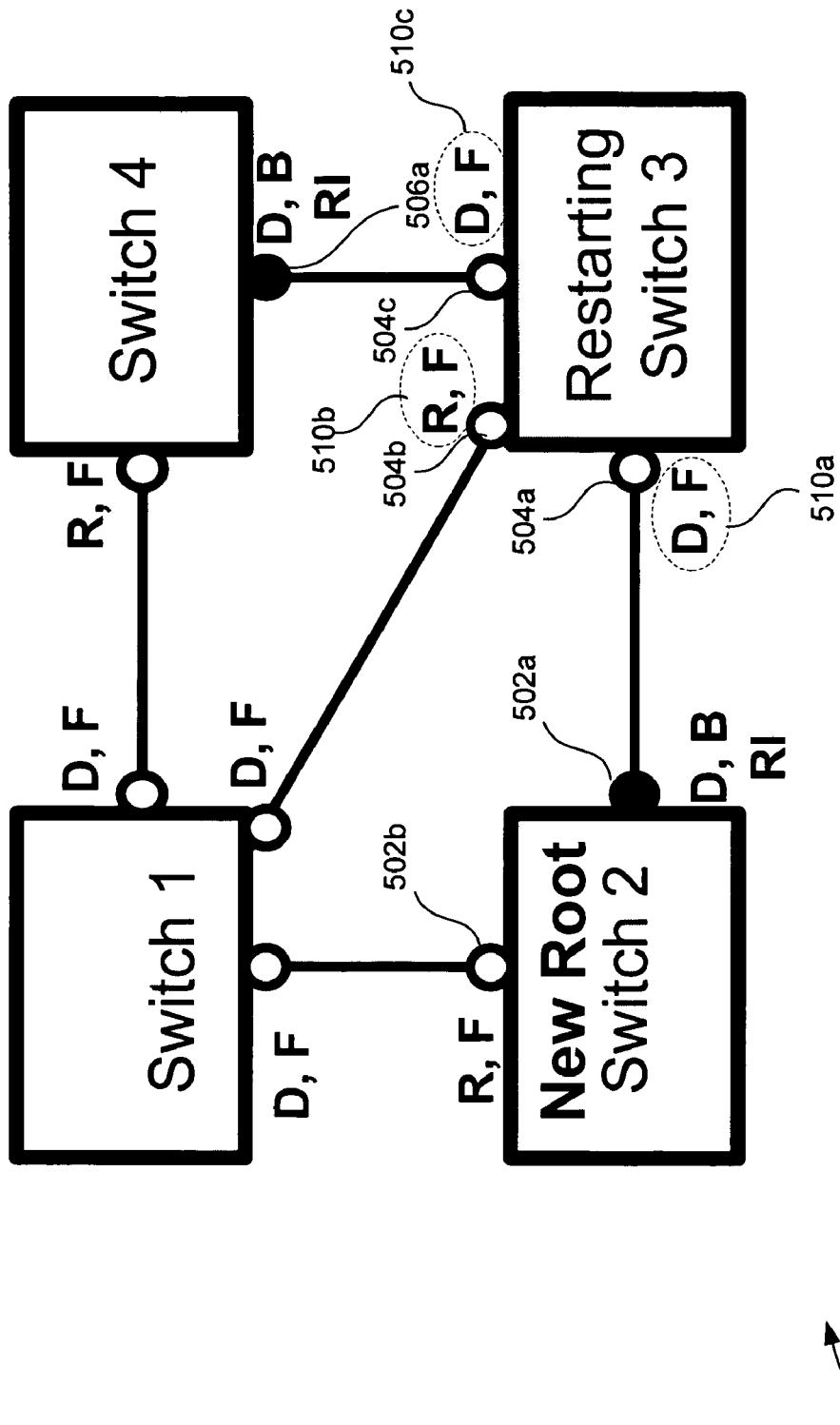
Figure 5D:
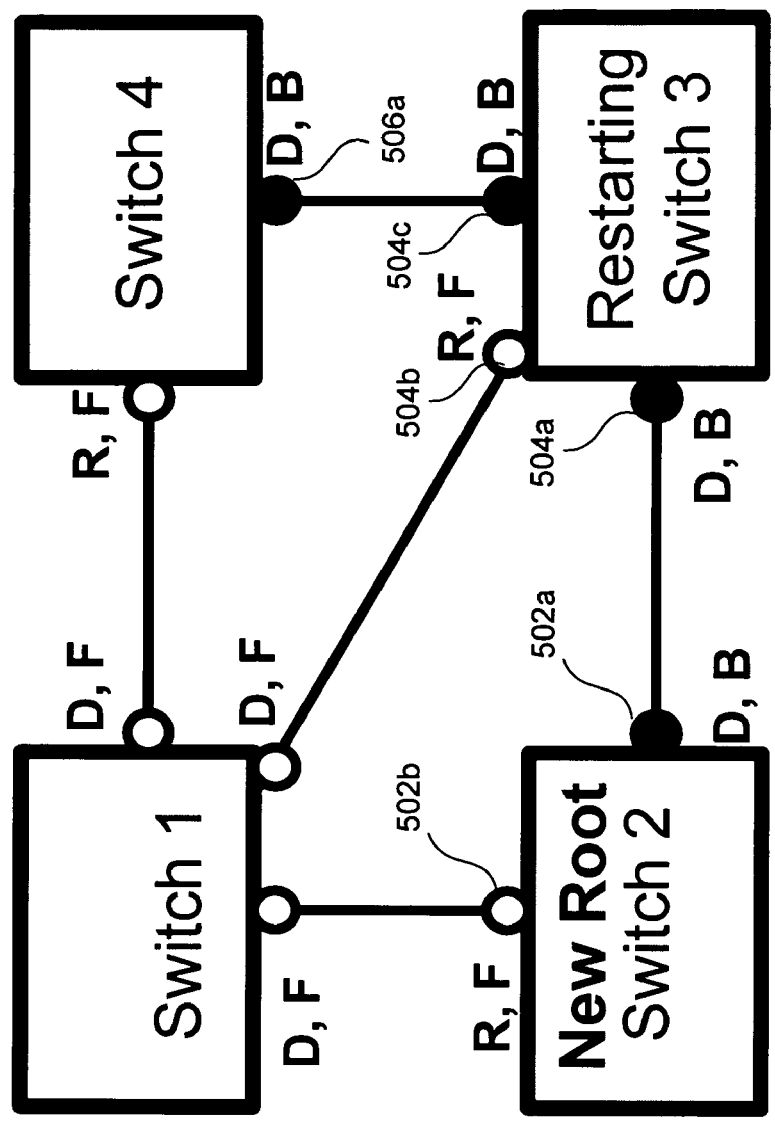

FIG. 5C illustrates the same network 500 after restart is complete for switch3. Switch3 recovers its STP port states and roles that were retained prior to restart shown in dotted ellipses 510. However, since the restarting switch3's peers have detected a topology change during the restart, it was a disruptive restart and all ports, except the former root are started in a Designated (D) role and a Blocking (B) state as shown in FIG. 5D. Switch3 will query its peer on its old root port 504b for the latest root information (which has changed). This new information is populated to all ports of switch3 before they start BPDU transmission. This prevents switch3 from injecting stale root information in the network which can cause instability of the network (a classical example is the "ghost-root" problem which is caused by a BPDU advertising a best root which is no longer there). The restarting switch3's peers are also moved to a normal STP state (e.g., D, B) once they get the restart complete message from the restarting switch. The Seamless Restart procedures for a restarting single supervisor may also be applied to various other scenarios, such as a new link being added during the restart and a root failure.

Embodiments of the present invention provide a seamless restart of switch's linecard or supervisor software by maintaining port forwarding in the restarting linecard during the restart without causing a change of the network topology. In one implementation, topology changes with respect to the restarting switch are deferred until after restart completes so as to maximize connectivity. Additionally, when a topology change occurs in the network, loops are prevented from forming in the network before, during, and after the restart.

The techniques of the present invention may be implemented in any suitable combination of hardware and software in which STP may be applied. For example, the techniques of the present invention can be implemented in an operating system kernel, in a separate user process, in a library package bound into network applications, on a specially constructed machine, or on a network interface card. In a specific implementation, they are implemented on a layer 2 switch of a computer network.

In one implementation, the switch includes at least one memory device and at least one processor. The memory and processor are operable to perform any of the above described techniques, as well as standard switching/routing operations, virtualization management, zone management, etc.

Figure 6:
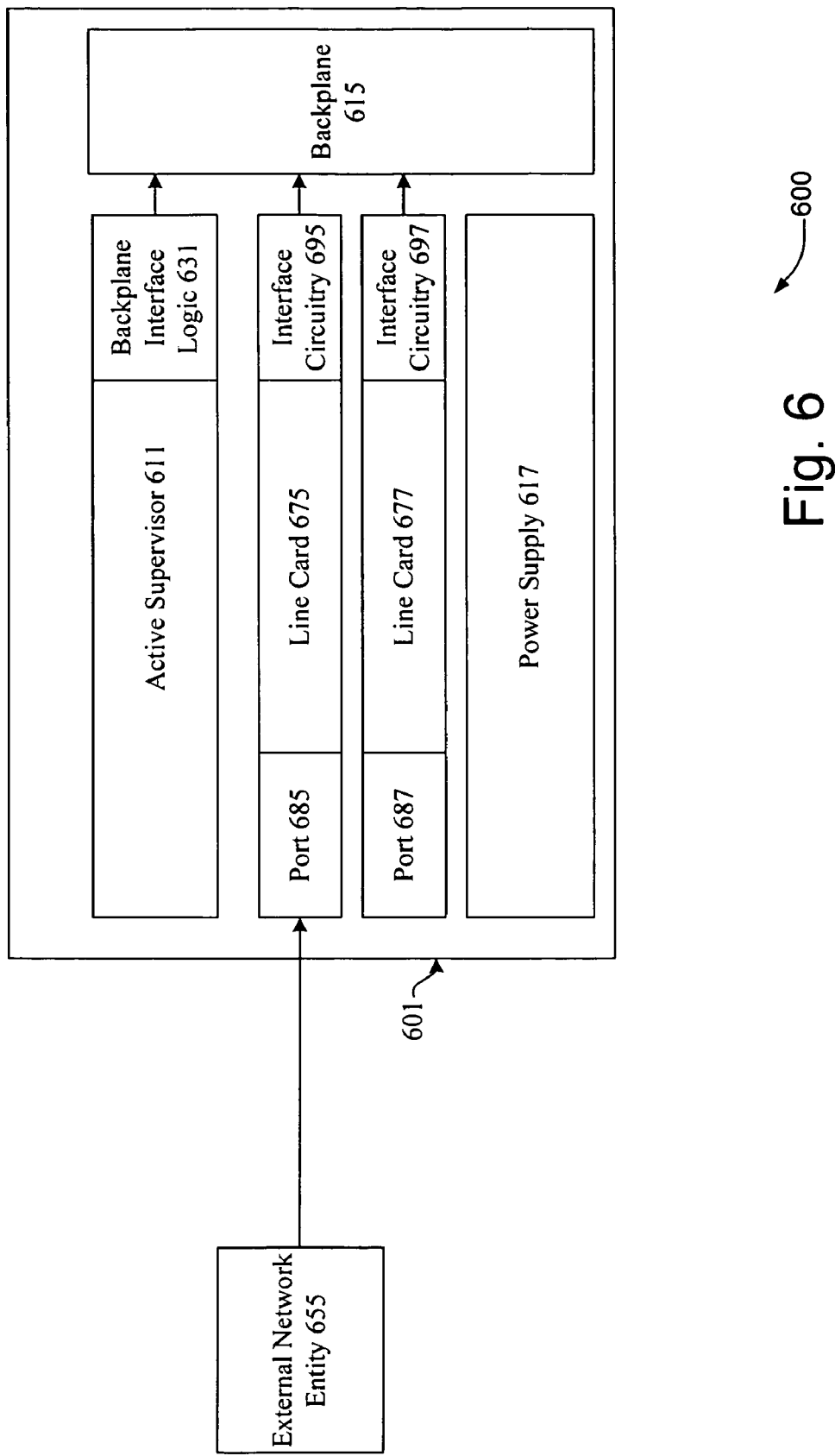
FIG. 6 is a block diagram of an example switch that may be used to implement embodiments of this invention.

FIG. 6 is a diagrammatic representation of one example of a switch that can be used to implement techniques of the present invention. Although one particular configuration will be described, it should be noted that a wide variety of switch and router configurations are available. The switch 601 may include one or more supervisors 611 (although the techniques of the present invention are more suitable for a single supervisor) and power supply 617. According to various embodiments, the supervisor 611 has its own processor, memory, and storage resources.

Line cards 675 and 677 can communicate with an active supervisor 611 through interface circuitry 695 and 697 and the backplane 615. The backplane 615 can provide a communications channel for all traffic between line cards and supervisors. Individual line cards 675 and 677 can also be coupled to external network entities, such as 655, through ports 685 and 687.

It should be noted that the switch can support any number of line cards and supervisors. In the embodiment shown, only a single supervisor is connected to the backplane 615 and the single supervisor communicates with many different line cards. The active supervisor 611 may be configured or designed to run a plurality of applications such as STP, routing, domain manager, system manager, and utility applications. The supervisor may include one or more processors coupled to interfaces for communicating with other entities.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

Regardless of switch's configuration, it may employ one or more memories or memory modules configured to store data, database(s), and program instructions for the general-purpose network operations and/or the inventive techniques described herein. The program instructions may control the operation of an operating system and/or one or more applications, for example. The memory or memories may also be configured to store root information, STP state information, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method of restarting a first network device having a plurality of ports for receiving and transmitting layer 2 data, wherein the first network device belongs to a network of network devices, the method comprising:

when a restart of at least a restarting network portion of the first network device is imminent where a spanning tree protocol (STP) is no longer functioning for the first network device during the restart and can no longer alter an STP state of one or more restarting ports of the first network device's ports during the restart, maintaining an STP forwarding state of each restarting port that is in such STP forwarding state so as not to change such STP forwarding state to a blocking state before or during the restart under predefined conditions; and during the restart, each of the restarting ports of the restarting network device portion cooperating with its peer port of a second non-restarting network device that is a neighbor of the first network device so as to prevent layer 2 loops in the network.

2. The method as recited in claim 1, wherein the restarting network portion is a single supervisor in the first network device and the STP is no longer functioning for the first network device during the restart, the method further comprising storing a complete STP state for the first network device in persistent storage that can be retrieved after the restart by the first network device.

3. The method as recited in claim 2, wherein each restarting port that is a Portfast port is maintained in the STP forwarding state during the restart and each restarting port that is shared by two or more other network devices is put in an STP blocked state during the restart.

4. The method as recited in claim 3, wherein each restarting port that is not shared and not a Portfast port is maintained in the STP forwarding state during the restart if it is determined that its peer can cooperate to prevent loops, the method further comprising informing the peers of the restarting ports, which can cooperate to prevent loops during the restart, about the restart.

5. The method as recited in claim 4, wherein each peer is informed that a restart is imminent, about the kind of restart, and of the completion of the restart when the restart is completed.

6. The method as recited in claim 5, wherein informing each peer can cause each informed peer to perform the following operations:

as long as there is no topology change detected by the each peer, prohibiting aging out of information received from the first network device into the each peer and prohibiting sending of Bridge Protocol Data Units (BPDU's) to the first network device; and when there is a topology change detected by the each peer, aging out the information on each port of the peer that has an alternate or root role and is peering with the first network device and changing the STP state of each port that is peering with the first network device to blocking and marking such each port as Restart-Inconsistent.

7. The method as recited in claim 6, wherein after each peer is informed that restart has completed, the each peer resumes an STP operation for its peering ports.

8. The method as recited in claim 2, further comprising performing the following operations after restart:
if it is determined that no topology change has been detected by a peer of the first network device, recovering the stored STP state and performing a stateful restart of STP for the first network device; and if it is determined that a topology change has been detected by a peer of the first network device, (i) initializing all ports of the first network device to a designated role and an STP blocking state and then starting STP if the first network device is not a root switch, or (ii) obtaining STP port information from the first network device's old root port and populating the obtained STP port information out the other ports of the first network device and initializing all ports of the first network device to the designated role and the STP blocking state, except the old root port, if the first network device is the root switch and then starting STP if the first network device is the root switch.

9. A first network device operable to restart, wherein the first network device has a plurality of ports for receiving and transmitting layer 2 data, wherein the first network device belongs to a network of network devices, the first network device comprising:
one or more processors;
one or more memory, wherein at least one of the processors and memory are configured for:
when a restart of at least a restarting network portion of the first network device is imminent where a spanning tree protocol (STP) is no longer functioning for the first network device during the restart and can no longer alter an STP state of one or more restarting ports of the first network device's ports during the restart, maintaining an STP forwarding state of each restarting port that is in such STP forwarding state so as not to change such STP forwarding state to a blocking state before or during the restart under predefined conditions; and
during the restart, each of the restarting ports of the restarting network device portion cooperating with its peer port of a second non-restarting network device that is a neighbor of the first network device so as to prevent layer 2 loops in the network.

10. The first network device as recited in claim 9, wherein the restarting network portion is a single supervisor in the first network device and the STP is no longer functioning for the first network device during the restart, wherein at least one of the processors and memory are further configured for storing a complete STP state for the first network device in persistent storage that can be retrieved after the restart by the first network device.

11. The first network device as recited in claim 10, wherein each restarting port that is a Portfast port is maintained in the STP forwarding state during the restart and each restarting port that is shared by two or more other network devices is put in an STP blocked state during the restart.

12. The first network device as recited in claim 11, wherein each restarting port that is not shared and not a Portfast port is maintained in the STP forwarding state during the restart if it is determined that its peer can cooperate to prevent loops, wherein at least one of the processors and memory are further configured for informing the peers of the restarting ports, which can cooperate to prevent loops during the restart, about the restart.

13. The first network device as recited in claim 12, wherein each peer is informed that a restart is imminent, about the kind of restart, and of the completion of the restart when the restart is completed.

14. The first network device as recited in claim 13, wherein informing each peer can cause each informed peer to perform the following operations:
as long as there is no topology change detected by the each peer, prohibiting aging out of information received from the first network device into the each peer and prohibiting sending of Bridge Protocol Data Units (BPDU's) to the first network device; and when there is a topology change detected by the each peer, aging out the information on each port of the peer that has an alternate or root role and is peering with the first network device and changing the state of each port that is peering with the first network device to blocking and marking such each port as Restart-Inconsistent.

15. The first network device as recited in claim 14, wherein after each peer is informed that restart has completed, the each peer resumes an STP operation for its peering ports.

16. A first network device as recited in claim 10, wherein at least one of the processors and memory are further configured for performing the following operations after restart:
if it is determined that no topology change has been detected by a peer of the first network device, recovering the stored STP state and performing a stateful restart of STP for the first network device; and if it is determined that a topology change has been detected by a peer of the first network device, (i) initializing all ports of the first network device to a designated role and an STP blocking state and then staffing STP if the first network device is not a root switch, or (ii) obtaining STP port information from the first network device's old root port and populating the obtained STP port information out the other ports of the first network device and initializing all ports of the first network device to the designated role and the STP blocking state, except the old root port, if the first network device is the root switch and then starting STP if the first network device is the root switch.

17. An apparatus for restarting a first network device having a plurality of ports for receiving and transmitting layer 2 data, wherein the first network device belongs to a network of network devices, the apparatus being in the form of the first network device and comprising:
means for when a restart of at least a restarting network portion of the first network device is imminent where a spanning tree protocol (STP) is no longer functioning for the first network device during the restart and can no longer alter a STP state of one or more restarting ports of the first network device's ports during the restart, maintaining an STP forwarding state of each restarting port that is in such STP forwarding state so as not to change such STP forwarding state to a blocking state before or during the restart under predefined conditions; and means for during the restart, each of the restarting ports of the restarting network device portion cooperating with its peer port of a second non-restarting network device that is a neighbor of the first network device so as to prevent layer 2 loops in the network.

18. A network system for restarting a first switch having a plurality of ports for receiving and transmitting layer 2 data, comprising:

a plurality of switches including the first switch and at least one neighbor switch coupled to the first switch, the first switch being operable to:

when a restart of at least a restarting network portion of the first switch is imminent where a spanning tree protocol STP is no longer functioning for the first switch during the restart and can no longer alter an STP state of one or more restarting ports of the first switch's ports during the restart, maintaining an STP forwarding state of each restarting port that is in such STP forwarding state so as not to change such STP forwarding state to a blocking state before or during the restart under predefined conditions; and during the restart, at least one of the restarting ports of the restarting switch portion cooperating with a peer port of the neighbor switch so as to prevent layer 2 loops in the network.

* * * * *